US008121392B2

(12) United States Patent
Popovich, Jr. et al.

(10) Patent No.: US 8,121,392 B2
(45) Date of Patent: Feb. 21, 2012

(54) EMBEDDED IMAGING AND CONTROL SYSTEM

(75) Inventors: Joseph Popovich, Jr., McMurray, PA (US); John Volkar, Mars, PA (US); Steven J. Remis, Alexandria, LA (US); William Toole, Wexford, PA (US)

(73) Assignee: Parata Systems, LLC, Durham, NC (US)

( * ) Notice: Subject to any disclaimer, the term of this patent is extended or adjusted under 35 U.S.C. 154(b) by 1688 days.

(21) Appl. No.: 10/972,492

(22) Filed: Oct. 25, 2004

(65) Prior Publication Data

US 2006/0088196 A1    Apr. 27, 2006

(51) Int. Cl.
  *G06K 9/00*  (2006.01)
(52) U.S. Cl. .................. 382/143; 382/124; 235/375
(58) Field of Classification Search .............. 382/143, 382/103, 111, 149, 312
  See application file for complete search history.

(56) References Cited

U.S. PATENT DOCUMENTS

| | | |
|---|---|---|
| 3,757,943 A | 9/1973 | Chae et al. |
| 3,969,227 A | 7/1976 | Garris |
| 4,082,188 A | 4/1978 | Grimmell et al. |

(Continued)

FOREIGN PATENT DOCUMENTS

EP    0 452 905 A1    10/1991

(Continued)

OTHER PUBLICATIONS

Gunawardena, C.A. et al., A Spot-Type Defect Detection and Colour Indentification System For Agricultural Produce, Proceedings Of The International Conference On Industrial Electronics, Control and Instrumentation (IECON). KOBE Oct. 28-Nov. 1, 1991, New York, IEEE, US, vol. 3 Conf. 17, Oct. 28, 1991, pp. 2531-2534.

(Continued)

*Primary Examiner* — Wesley Tucker
*Assistant Examiner* — Aklilu Woldemariam
(74) *Attorney, Agent, or Firm* — Myers Bigel Sibley & Sajovec

(57) ABSTRACT

A stand alone imaging system is disclosed that captures undistorted, high resolution, stop-action images of objects (e.g., medicine pills) moving at automation speeds, processes the images in real time, and then performs real-time I/O based control that is a function of the image processing results. The imaging system has a form factor that enables it to be embedded inside a product (e.g., a pill dispenser). The imaging system also has a flexible I/O system so that a variety of different applications can be handled by changing only the programming and the external hardware connected to the device in which the imaging system is embedded. In the case of pill dispensing and quality control, a miniature, low cost imaging system can be embedded in a pill dispenser to obtain a pill image and then process the image in real time as the pill moves through a counting system. The embedded imaging system processes the images fast enough and with sufficient quality and resolution so as to command a pill counting mechanism to dispense or reject the pill based on the image processing results. Images of the pills can also be sent to a remote location or an archive. The embedded imaging system has sufficient processing power and I/O to control the entire pill counting mechanism. Lighting may be provided by a separate solid state lighting source which may be controlled by the embedded imaging system's camera or operated independently. Because of the rules governing abstracts, this abstract should not be used to construe the claims.

26 Claims, 9 Drawing Sheets

U.S. PATENT DOCUMENTS

| | | |
|---|---|---|
| 4,117,935 A | 10/1978 | Richardson et al. |
| 4,123,352 A | 10/1978 | Yamamoto et al. |
| 4,143,770 A | 3/1979 | Grimmell et al. |
| 4,172,526 A | 10/1979 | Moser |
| 4,223,751 A | 9/1980 | Ayers et al. |
| 4,277,803 A | 7/1981 | Sano |
| 4,338,024 A * | 7/1982 | Bolz et al. ............. 356/23 |
| 4,354,602 A | 10/1982 | Miyoshi et al. |
| 4,379,509 A | 4/1983 | Bohle |
| 4,446,481 A | 5/1984 | Edamatsu et al. |
| 4,619,356 A | 10/1986 | Dean et al. |
| 4,695,163 A | 9/1987 | Schachar |
| 4,697,245 A | 9/1987 | Kara et al. |
| 4,741,428 A | 5/1988 | Taniguchi et al. |
| 4,759,074 A | 7/1988 | Iadipaolo et al. |
| 4,784,275 A | 11/1988 | Fridge |
| 4,912,554 A * | 3/1990 | Neri ..................... 348/125 |
| 4,976,356 A | 12/1990 | Mizuno et al. |
| 4,982,412 A | 1/1991 | Gross |
| 5,004,339 A | 4/1991 | Pryor et al. |
| 5,065,510 A | 11/1991 | Ostermann et al. |
| 5,077,806 A | 12/1991 | Peters et al. |
| 5,085,510 A | 2/1992 | Mitchell |
| 5,114,230 A | 5/1992 | Pryor |
| 5,240,118 A | 8/1993 | Mayer |
| 5,247,169 A | 9/1993 | Okada et al. |
| 5,313,508 A | 5/1994 | Ditman et al. |
| 5,317,645 A | 5/1994 | Perozek et al. |
| 5,337,902 A | 8/1994 | Evans et al. |
| 5,363,968 A | 11/1994 | Soloman |
| 5,422,831 A | 6/1995 | Misra et al. |
| 5,454,016 A | 9/1995 | Holmes |
| 5,463,465 A | 10/1995 | Yamamoto et al. |
| 5,508,512 A | 4/1996 | Gray et al. |
| 5,522,512 A | 6/1996 | Archer et al. |
| 5,526,437 A | 6/1996 | West |
| 5,597,995 A * | 1/1997 | Williams et al. ......... 235/375 |
| 5,600,437 A | 2/1997 | Erdentug |
| 5,659,624 A | 8/1997 | Fazzari et al. |
| 5,661,249 A | 8/1997 | Rupp et al. |
| 5,746,323 A | 5/1998 | Dragotta |
| 5,747,822 A | 5/1998 | Sinclair et al. |
| 5,768,327 A | 6/1998 | Pinto et al. |
| 5,812,693 A | 9/1998 | Burt et al. |
| 5,819,953 A | 10/1998 | Julius et al. |
| 5,826,696 A | 10/1998 | Rupp et al. |
| 5,845,002 A | 12/1998 | Heck et al. |
| 5,878,868 A | 3/1999 | Gotoh et al. |
| 5,884,806 A | 3/1999 | Boyer et al. |
| 5,887,073 A | 3/1999 | Fazzari et al. |
| 5,907,493 A | 5/1999 | Boyer et al. |
| 5,946,883 A * | 9/1999 | Yuyama et al. ............ 53/154 |
| 5,960,098 A | 9/1999 | Tao |
| 6,002,996 A | 12/1999 | Burks et al. |
| 6,078,683 A | 6/2000 | Denison et al. |
| 6,079,284 A | 6/2000 | Yamamoto et al. |
| 6,108,030 A | 8/2000 | Yamamoto et al. |
| 6,112,902 A | 9/2000 | Hayduchok et al. |
| 6,237,743 B1 | 5/2001 | Bracher |
| 6,282,462 B1 | 8/2001 | Hopkins |
| 6,317,648 B1 | 11/2001 | Sleep et al. |
| 6,324,253 B1 | 11/2001 | Yuyama et al. |
| 6,330,351 B1 * | 12/2001 | Yasunaga ................ 382/141 |
| 6,345,487 B1 | 2/2002 | Luciano et al. |
| 6,363,687 B1 | 4/2002 | Luciano et al. |
| 6,384,421 B1 | 5/2002 | Gochar, Jr. |
| 6,446,632 B1 | 9/2002 | Focke |
| 6,484,886 B1 | 11/2002 | Isaacs et al. |
| 6,497,342 B2 | 12/2002 | Zhang et al. |
| 6,509,537 B1 | 1/2003 | Krieg et al. |
| 6,512,578 B1 | 1/2003 | Komatsu et al. |
| 6,531,707 B1 | 3/2003 | Favreau et al. |
| 6,535,637 B1 * | 3/2003 | Wootton et al. ............ 382/190 |
| 6,564,168 B1 | 5/2003 | Hasser |
| 6,610,953 B1 | 8/2003 | Tao et al. |
| 6,610,973 B1 | 8/2003 | Davis, III |
| 6,614,916 B2 | 9/2003 | MacDonald |
| 6,661,911 B1 | 12/2003 | Ishikura et al. |
| 6,741,731 B1 | 5/2004 | Yamamoto et al. |
| 6,961,448 B2 * | 11/2005 | Nichols et al. ............ 382/115 |
| 7,099,741 B2 | 8/2006 | Baranowski |
| 7,139,639 B2 | 11/2006 | Broussard et al. |
| 7,139,693 B1 | 11/2006 | Dake et al. |
| 7,489,808 B2 * | 2/2009 | Gerder ..................... 382/124 |
| 2001/0008561 A1 | 7/2001 | Paul |
| 2001/0012381 A1 | 8/2001 | Sari-Sarraf et al. |
| 2001/0014171 A1 | 8/2001 | Iijima et al. |
| 2001/0055416 A1 | 12/2001 | Yamashita |
| 2002/0025061 A1 | 2/2002 | Metcalfe et al. |
| 2002/0049375 A1 * | 4/2002 | Strommer et al. ............ 600/407 |
| 2002/0057852 A1 | 5/2002 | Durbin et al. |
| 2002/0071603 A1 | 6/2002 | Ungpiyakul et al. |
| 2002/0080999 A1 | 6/2002 | Bani-Hashemi et al. |
| 2002/0089583 A1 | 7/2002 | You et al. |
| 2002/0107613 A1 | 8/2002 | Hopkins |
| 2002/0114527 A1 | 8/2002 | Horie |
| 2002/0118873 A1 | 8/2002 | Tran et al. |
| 2002/0141658 A1 | 10/2002 | Novak |
| 2002/0177974 A1 | 11/2002 | Ting et al. |
| 2003/0067540 A1 | 4/2003 | Cox |
| 2003/0097551 A1 | 5/2003 | Fuller et al. |
| 2003/0120390 A1 | 6/2003 | Hopkins |
| 2003/0139848 A1 | 7/2003 | Cifra et al. |
| 2003/0152271 A1 | 8/2003 | Tsujino et al. |
| 2003/0190076 A1 | 10/2003 | DeLean |
| 2003/0213909 A1 | 11/2003 | Nozoe et al. |
| 2003/0215147 A1 | 11/2003 | Reichenbach et al. |
| 2004/0021856 A1 | 2/2004 | Nishiyama et al. |
| 2004/0036866 A1 | 2/2004 | Nielsen |
| 2004/0042644 A1 | 3/2004 | Yuasa et al. |
| 2004/0052418 A1 | 3/2004 | DeLean |
| 2004/0061850 A1 | 4/2004 | Fisch et al. |
| 2004/0070753 A1 | 4/2004 | Sugihara et al. |
| 2004/0093181 A1 | 5/2004 | Lee |
| 2004/0101161 A1 | 5/2004 | Roh et al. |
| 2004/0105093 A1 | 6/2004 | Hamamatsu et al. |
| 2004/0130709 A1 | 7/2004 | Yamamoto |
| 2004/0151364 A1 | 8/2004 | Kenneway et al. |
| 2005/0217208 A1 | 10/2005 | Cicognani |

FOREIGN PATENT DOCUMENTS

WO    WO 01/59691 A1    8/2001

OTHER PUBLICATIONS

Examiner's Report for Australian Patent Application No. 2005299505.

* cited by examiner

EMBEDDED IMAGING AND CONTROL SYSTEM

BACKGROUND

1. Field of the Disclosure

The present disclosure generally relates to imaging systems and, more particularly, to a system and method to perform imaging and control using an embedded imaging system.

2. Brief Description of Related Art

There are many types of automated equipment that count and dispense pharmaceutical pills in pharmacies, hospitals and central fill facilities for end use. These types of pill counting and dispensing machines use thru-beam optical sensors to count pills as they are dispensed. Some of the machines also make crude attempts to detect pill fragmentation using multiple thru-beam optical sensors.

Pharmaceutical companies sometimes use vision-based applications to examine pills and make decisions about pill quality. However, the vision-based inspection requirements of a pharmaceutical production facility are significantly different from those of a retail pill counting and dispensing machine that would be used in a central fill facility, mail order pharmacy, hospital or other health care related institution. As a result, the pharmaceutical production facility typically uses a different type of vision-based inspection mechanism. In a pharmaceutical production facility, typically there are many more of the same type of pills, all moving at much higher speeds. These factors push the production facility image processing requirements to a level where high end vision processors are required and there is no excess processing time left to handle real time processing of I/O (Input/Output) data within the camera sensor itself. As a result, the vision mechanism used in a pharmaceutical production facility is not an embedded piece of equipment. It is a bolt-on, external sensor that provides live video feed that is externally processed using a powerful external processing system. All I/O control (e.g., movement of a robot arm to grab a pill) and related I/O decision making processes are handled external to the vision mechanism. In summary, the pharmaceutical production facility vision mechanism is of a different type that cannot be used in the pill counting and sorting machines used in pharmacies, hospitals, central fill or mail order facilities.

Although vision-based inspection mechanisms do exist for use in automation applications, all of these systems cost on average $4,000. These systems fall into the four categories described below.

The first category consists of a large camera package which is connected to an external PC (Personal Computer) or image processing and I/O control unit. The PC or remote processing and control unit performs the image processing and I/O control functions. These systems are much too large to be used in an embedded application. In fact, these mechanisms are larger than most of the pill counting and inspection products.

The next category consists of a camera package that interfaces to the world using a communications port (such as USB (Universal Serial Bus), Firewire or Camera Link). The communications port is used to output images and provide access to the internal image processing algorithm. An external trigger is used to initiate image capture. The purpose of this system is to output processed stop action images. However, these systems are unsuitable for many embedded applications because external hardware is required to evaluate the processed image and/or initiate I/O control of external devices based on the results of the evaluation. This type of vision mechanism usually uses large adjustable stock lenses and is encased in a metal box which makes the unit physically too large for embedded applications.

The third category consists of dedicated vision based sorting devices that are comprised of a camera, an internal hardware-coded image processing algorithm and between 6 and 8 bits of digital I/O. The devices compare the captured image to a reference and output 6 to 8 bits of pass/fail criteria on digital I/O. No other I/O exists. The I/O output is an image processing result as opposed to an I/O controller output. Although this image processor output may be used to perform rudimentary control, the device does not contain a controller and there are no resident controller algorithms. These devices are typically too large for embedded use and they do not have an I/O controller or controller programming capability, only several bits of image pass/fail results, which may or may not be usable for process control. Although the image processor in such devices uses variables, which a user may set, the image processing is hardware coded and cannot be altered.

The last category includes products sold by DVT sensors, which are advertised as "smart camera sensors." These vision sensors can control camera lighting. They perform both image processing and limited I/O control. These products provide 8 bits of direct digital I/O and access to additional I/O data through an Ethernet or Fieldbus connection. These 8 bits of digital I/O are primarily used to report vision algorithm results, control camera lighting, and provide camera event triggering. Although these vision sensors are physically small enough to fit in most embedded applications, a closer examination of the capabilities and characteristics of such smart camera sensors shows that they are incompatible with most embedded applications. Smart camera sensors are similar to PC based vision applications, downsized through the use of newer technology, until the package fits in the palm of the hand. However, the smart camera sensors still primarily remain vision sensors that happen to be small, but they lack real-time I/O processing and I/O control capabilities, as will be explained later.

Some other devices with image capturing capabilities include picture phones and digital cameras. Picture phones employ continuous scan imaging sensors. This technology is incompatible with capturing high resolution, real time, moving images (e.g., image of pills on a conveyor belt in a pharmaceutical production facility) without unacceptable blurring unless the moving object is relatively far away. This is because pictures of a moving object will have good resolution only if the object is sufficiently far away so that the object speed is slow relative to both the electronic shutter speed and the camera sensor scan speed. Some digital cameras employ image sensors with a global shutter. This technology is compatible with capturing high resolution, real time, moving images without unacceptable blurring, if the camera has electronic shutter speeds that are fast enough to "freeze" the object motion. Most digital camera sensors have electronic shutter speeds that are faster than the speeds of shutters in picture phones, but the image sensors in digital cameras are still usually an order of magnitude or more too slow for most applications. In the case of taking an image of a moving pill, the digital camera sensor might be able to do the job if the camera is moved slow and steady enough to enable the use of the camera's slower electronic shutter speeds.

However, a picture phone or digital camera cannot be programmed to perform real time image processing that will result in an output that can be used to control image process related real time I/O. Both picture phones and digital cameras employ dedicated electronics to adjust the image in ways that are more appealing to the human eye. They perform tasks such as balancing the light and dark areas in the image, removing red eye and making color corrections. The output is then placed in storage and/or made available for display. These devices do not possess a programmable microprocessor or a DSP (Digital Signal Processor) that can be programmed to perform real time image processing that would yield an output that can be used by a real time I/O controller. This means that these devices have the ability to generate a nice picture for a human to look at, but they do not possess the ability to draw any conclusions about the picture in real time or otherwise.

As to real time I/O control and interface, it is observed that the I/O control and interface on a picture phone consists of a GUI (General User Interface) that can be manipulated by the user/operator to send the image to a remote location. This is not a real time I/O control and interface hardware, and it cannot be adapted to perform this function. Digital cameras have a variety of I/O, none of which can accomplish real time process control. Usually the camera has a manual motorized zoom, an interface to facilitate internal image storage, and an interface that enables image download to an external device such as a printer or computer. These are not real time processes and the hardware that performs these processes does not have an architecture that supports a real time requirement.

It is therefore desirable to develop a real time embedded vision system wherein all of the image capture, image processing, I/O controller and I/O interface hardware fits inside a package that is small enough to reside inside most machines that would employ such a device. It is also desirable for all of the image capture and image processing, as well as all the I/O processing and I/O control, to be in real time and for the embedded vision system to run off the available power.

SUMMARY

The vision system according to the present disclosure is a stand alone miniature imaging system that could capture undistorted, high resolution, stop-action images of objects moving at automation speeds, process the images in real time, and then perform real-time I/O based control that is a function of the image processing results. The system also has a miniature form factor so that it could be embedded inside a product. Ideally, the device would fit easily in the palm of a person's hand. The imaging system would have a flexible I/O system so that a variety of different applications could be met by changing only the programming and the external hardware connected to the device in which the imaging system is embedded. The device may be built at a cost of several hundred dollars or less in retail quantities.

In one embodiment, the vision system is a miniature, low cost, embedded device that controls the flow of pills in a pill counting and dispensing device, obtains real time images of each pill, real time processes each image, and then real time commands a pill counting mechanism to dispense or reject each pill based on the image processing results. Images of the pills can also be sent to a remote location or an archive. The imaging system has enough processing power and I/O to control the entire pill counting and dispensing mechanism. Lighting is provided by a separate solid state lighting source which may be controlled by the embedded vision system or operated independently.

In one embodiment, the present disclosure contemplates a system that comprises a unit, which includes: one or more controllable hardware parts; and a sensor system embedded within the unit and configured to perform the following in real-time: producing images of a field in the vicinity of the unit, processing the images to extract image-related information for each image, and controlling the operation of the one or more hardware parts based on the extracted image-related information.

In another embodiment, the present disclosure contemplates a system that comprises a unit, which includes: one or more controllable hardware parts; and a camera-based vision system embedded within the unit and configured to perform the following: operating a camera in the vision system to produce images of a visual field in the vicinity of the unit, processing the images in real-time to extract image-related information for each image, and controlling operation of the one or more hardware parts in real-time based on the extracted image-related information.

In an alternative embodiment, the present disclosure contemplates a method that comprises performing the following using an embedded imaging system: taking a picture of an item; comparing the picture with a pre-stored image of the item in real-time; and determining quality of the item based on the comparison.

In a still further embodiment, the present disclosure contemplates a method, which comprises: producing a picture of an item with a camera embedded in a unit when the item is being transported by the unit; comparing in real-time the picture with a pre-stored image of the item; and operating one or more hardware parts in the unit in real-time in response to the comparison.

BRIEF DESCRIPTION OF THE DRAWINGS

For the present disclosure to be easily understood and readily practiced, the present disclosure will now be described for purposes of illustration and not limitation, in connection with the following figures, wherein.

DETAILED DESCRIPTION

Reference will now be made in detail to certain embodiments of the present disclosure, examples of which are illustrated in the accompanying figures. It is to be understood that the figures and descriptions of the present disclosure included herein illustrate and describe elements that are of particular relevance to the present disclosure, while eliminating, for the sake of clarity, other elements found in typical imaging systems. It is noted at the outset that the terms "connected", "coupled," "connecting," "electrically connected," etc., are used interchangeably herein to generally refer to the condition of being electrically connected or coupled.

Figure 1:
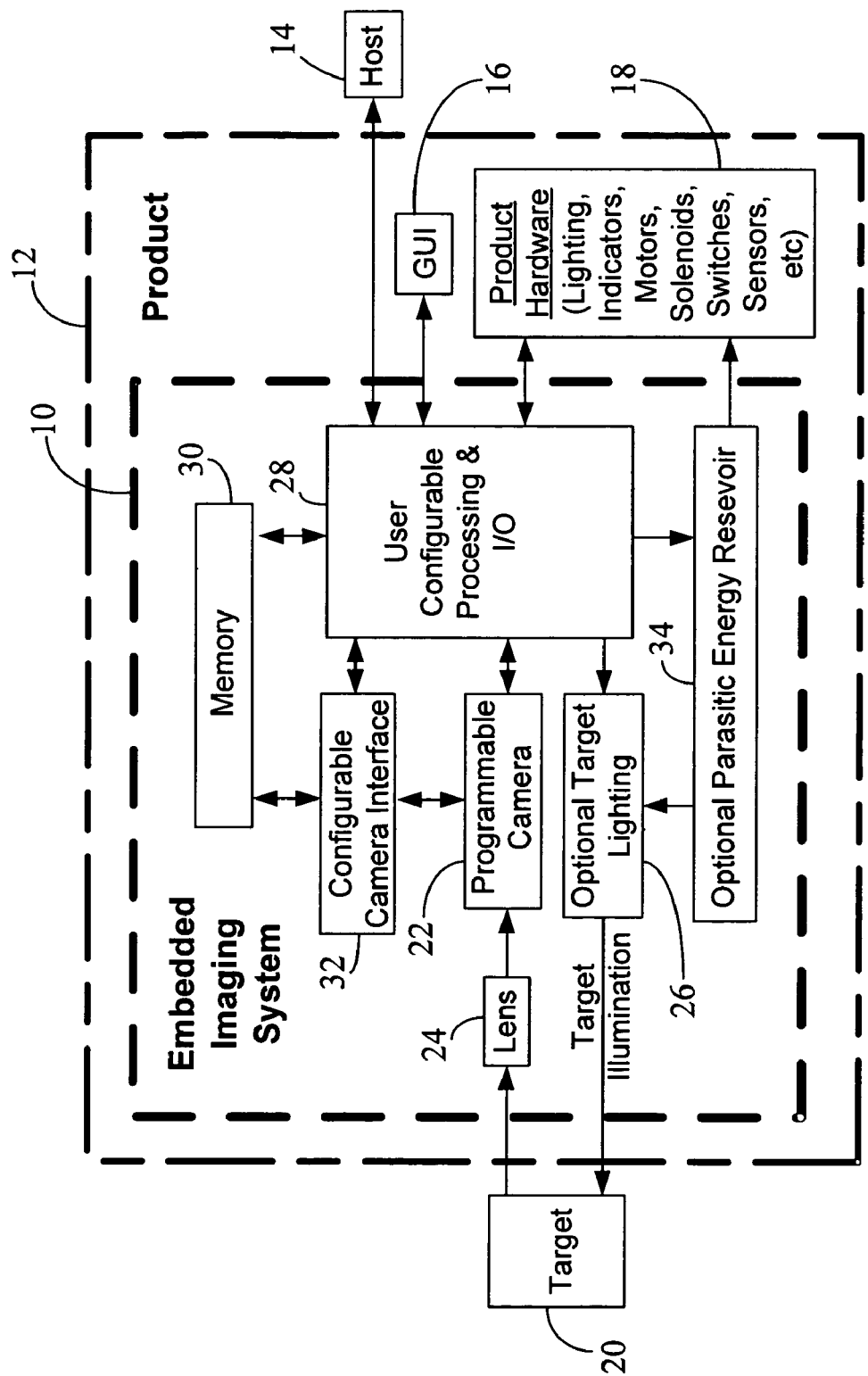
FIG. 1 shows a high level block diagram of an exemplary embodiment of an embedded imaging system according to the present disclosure.

FIG. 1 shows a high level block diagram of an exemplary embodiment of an embedded sensor or imaging system 10 according to the present disclosure. The imaging system 10 is shown embedded in a typical generic product or unit 12. In this embodiment, the system 10 is doing more than taking images and handling image processing as discussed in detail hereinbelow. The sensor system 10 is interfaced to both a high level host 14 (which can be a PC (Personal Computer) or a work station, either stand alone or in a networked configuration) and a GUI 16 on the unit 12, with each connection using a communications port. The system 10 is also shown connected to and/or controlling external hardware 18 (of the product 12), including motors, lighting and sensors. Other components illustrated in FIG. 1 are discussed hereinbelow at relevant places. It is noted here that the term "external" in the phrase "external hardware" used hereinabove refers to the hardware that may be physically external to the embedded imaging system 10, but integral to or part of the product 12.

To better understand the implementation of FIG. 1, it is useful to turn FIG. 1 into a more specific example. Assuming, for example, that the product 12 in FIG. 1 is a pill counting machine used in a pharmacy. The embedded imaging system 10 within the pill counting machine 12 would then utilize the external motor and sensors (the product hardware 18) of the pill counting machine 12 to position a stream of pills (or targets 20) in front of a programmable camera 22, i.e., in front of the lens 24 of the camera 22. The embedded imaging system 10 may then engage a lighting unit 26 (in preparation for taking a picture of the pill 20) and perform real time image processing (using a user configurable processing and I/O unit 28), when prompted by pill position sensors 18, located somewhere along the pill path (e.g., a conveyor belt or a chute) within the pill counting machine 12. Based on the processed image result, the embedded image system 10 may command the motor and solenoids 18 inside the pill counting machine 12 to drop the pill 20 in the "accept" or "reject" bin (not shown). In this example, the embedded imaging system 10 may also send a copy of the pill's image to the host 14 for archiving. Thus, the embedded sensor system 10 maintains a very flexible interface to the outside world, because most of the external I/O, communications and control requirements are application specific. This external interface will be discussed in much greater detail later hereinbelow.

Before proceeding further, it is preferable to discuss some examples where the sensor system 10 may be embedded inside a machine or product 12. The vision system 10 can be used, in conjunction with application specific vision based processes, to enable a machine 12 to: (1) Count or not count an object 20 or event. (2) Discriminate attributes about an object or event. Some examples of vision based discrimination include, but are not limited to, determining the object size, color, shape, orientation, spectra, position, identity and state of completeness or physical integrity (e.g., whether a pill is fragmented or not). (3) Obtain and/or store images (taken by the camera 22) which may be processed and/or unprocessed. (4) Obtain and/or transmit camera images which may be processed and/or unprocessed. (5) Assist with or perform object singulation (e.g., during pill counting) and/or object motion control. (6) Assist with or perform object orientation and/or positioning. (7) Perform a function or process such as, but not limited to, accepting or rejecting an object or event based on the results of the image processing. (8) Utilize multiple embedded imaging systems (e.g., when multiple embedded cameras and lighting units are needed) in a manner that enables an object or event to be viewed from multiple angles and/or positions and/or at different points in time. (9) Be used with a multiplicity of mirrors in a manner that enables an object or event to be viewed from multiple angles and/or positions and/or at different points in time. (10) Control additional external lighting sources. (11) Respond to instructions from an external computer (e.g., the host computer 14) or user interface (e.g., the GUI 16). (12) Perform a self or process calibration. (13) Use an optional parasitic energy reservoir 34 to insure that the embedded system 10 does not draw more power than the input can deliver without creating a fault condition. (14) Use the optional parasitic energy reservoir 34 to provide supplemental energy when the embedded vision system 10 requires more energy than the input power source can deliver. (15) Obtain and use continuous or semi-continuous images as feedback to control a real time packaging process.

Figure 2:
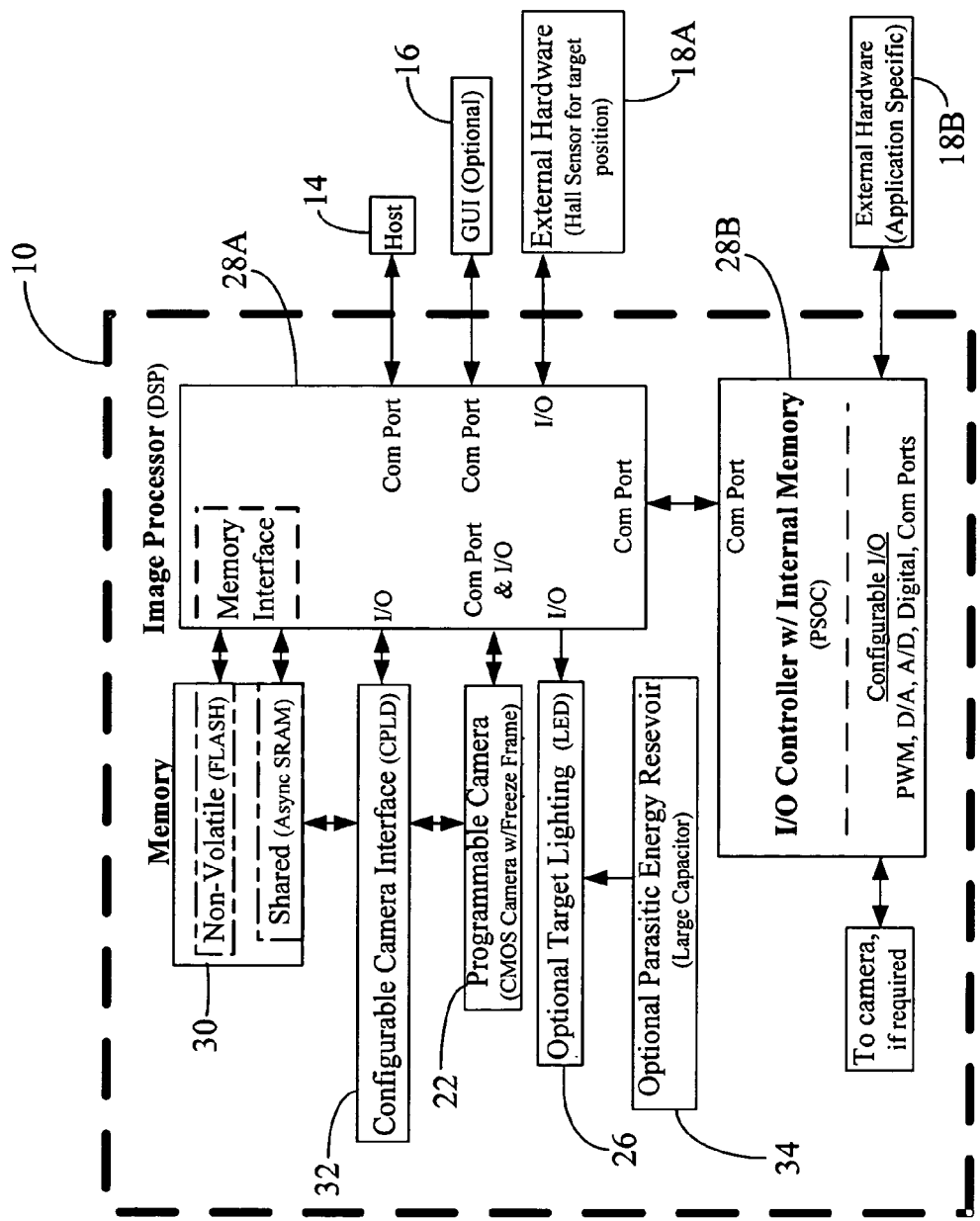
FIG. 2 shows the embedded imaging system of FIG. 1 subdivided into modular components.

FIG. 2 shows the embedded imaging system 10 of FIG. 1 subdivided into modular components, some of which are individually discussed below. The product hardware portion 18 in FIG. 1 is shown subdivided into two separate external hardware blocks 18A and 18B. The host 14 and GUI 16 are shown separate from the other external hardware 18A, 18B. The user configurable processing and I/O unit 28 is also shown functionally subdivided into two separate units-an image processor or DSP (digital signal processor) unit 28A, and an I/O controller 28B. The host and/or GUI can be connected to either the image processor 28A or the I/O controller 28B, depending upon the embodiment. For example, the application may require the image processor 28A to be almost fully occupied performing image processing, while at the same time a host 14 may require an instant response to every query. In that case, using a dedicated I/O controller 28B to supplement the image processor I/O could result in an embodiment that insures the host 14 will always receive an instant query response. In another example, the GUI 16 may have an unusual interface that is more efficiently handled by a dedicated I/O controller 28B than the image processor I/O, even though the image processor 28A could easily meet the timing constraints required by the GUI application. As discussed later hereinbelow, the term "I/O" takes on a broad meaning when used in the context of the present disclosure of the embedded imaging system 10. Those of ordinary skill in the art will recognize that FIG. 2 contains reference to both general functional blocks (such as "image processor" 28A, "memory" 30, etc.) as well as specific technologies (such as "DSP" or "flash"). The technology-specific information is provided for a better understanding of the present disclosure and is not meant to narrow the scope of the disclosure or the claims included hereinbelow. For example, rather than implementing the "image processor" functionality using a DSP, other technologies can be used as is known in the art. Some examples of alternative choices include microprocessor, FPGA, or ASIC (application specific integrated circuit). In the like manner, each of the other functional blocks in FIG. 2 can be implemented using other alternative technologies.

Camera 22

The vision system 10 is an embedded automation application that captures one or more images of a moving object or target 20 and reacts to it. To avoid image blurring and meet the embedded system's requirements, the camera 22 should preferably meet the following general requirements: (1) Be extremely small. (2) Initiate image capture via an external trigger signal (e.g., from the DSP 28A via a corn port) (not shown). (3) Be able to capture the moving image (e.g., the image of a moving pill) with sufficient quality to meet the image processing requirements. Both the moving image and the image processing requirements are application specific. (4) Have a sufficient frame rate to satisfy the application on hand (e.g., pill counting, pill inspection, etc.). (5) The camera should preferably have an electronic shutter so that an image can be captured and transmitted electronically.

Insuring that the camera 22 can capture a good quality image may be accomplished by correctly specifying camera parameters that are consistent with the application on hand. This is a straight forward, routine task that can be performed with the help of any camera supplier. A partial list of camera parameters that may need to be specified includes: (1) The level of acceptable image blurring, rastering or any other motion related distortion; (2) image resolution; (3) camera field of view; (4) color and/or gray scale parameters; (5) light sensitivity; (6) image correction factors; (7) lighting requirements; (8) frame rate; (9) image integration time; and (10) image output format and method.

Most camera types, including those found in web cams, digital cameras, and cell phones have attributes that are inconsistent with at least one of the above general requirements. For example: (1) Progressive or interlace scan cameras integrate images one line at a time, as opposed to simultaneously integrating the entire image. This type of camera currently cannot capture an undistorted stop action image of an object moving at automation speeds, unless the automation speed is uncharacteristically slow. For example, a typical pharmacy automation machine dispenses pills at approximately 8 pills/sec. In this situation, an automation camera has 135 microseconds or less to capture each pill image to avoid unacceptable image blurring. Progressing scan cameras are one hundred times too slow. (2) Cameras that send continuous streaming video usually lack the ability to initiate a new image capture via a user controlled trigger signal. Unless the camera has a very high frame rate relative to the object speed, these cameras cannot insure that they will always capture the moving object in the desired field of view. (3) Some cameras are too large because of the technology they employ. For example, many consumer digital cameras employ CCD (Charge Coupled Device) camera sensors which require specialized support ICs (Integrated Circuits) to provide numerous timing signals and voltages. These support ICs frequently add size and an overly complicated interface that makes such digital cameras too large for many deeply embedded applications. (4) The size of the camera lens also matters in an embedded application. If the camera employs lenses that are too big, then the camera is unusable. Cameras that employ an adjustable or full body lens generally are too large to be used in embedded applications.

The embodiment of FIG. 2 uses a new camera IC (for the camera unit 22) specifically designed for the automation market. The IC is a ½ inch CMOS active pixel image sensor, part number MT9V403C125STC, produced by Micron Technology, Inc. It is a sensor that can provide true stop action, high frame rate, high resolution images of moving objects. The camera freeze-frame electronic shutter enables the signal charges of all the frame pixels to be integrated at the same time. This type of camera, fitted with a miniature lens, is preferable for embedded applications contemplated by the present disclosure.

It is observed here that the image-taking according to the present disclosure is not limited to taking of images of a visual field (or visual images). On the contrary, the imaging system 10 may be devised for an application involving taking of electromagnetic (visual and non-visual) images of a camera's field of view. In that case, the camera 22 may be any one of the following: an infrared camera, an NIR (Near Infrared) camera, an SWIR (Short Wave Infrared) camera, an X-ray imaging camera, an ultrasonic camera, etc. Thus, the camera 22 may be a conventional visual-field camera (e.g., a web cam or a digital camera) or a non-visual field, electromagnetic image capture camera (e.g., an infrared camera). An NIR camera, for example, may be used in a robotic seam tracking application discussed later hereinbelow.

Configurable Camera Interface 32

The configurable camera interface module 32 may perform the following functions: (1) Generating any external timing signals or voltages the camera 22 requires. (2) Transferring images from the camera 22 to the memory module 30 (discussed later hereinbelow). In one embodiment, the configurable camera interface 32 performs these image transfers without external supervision or assistance. (3) Providing some method whereby the processor can know that a new image is in memory. This can be accomplished by notifying the processor directly, setting a status bit in the configurable camera interface hardware, or loading the image status in a memory location. (4) Being reconfigurable to accommodate different camera sensors with no or minimal impact on the other system modules.

Figure 3:
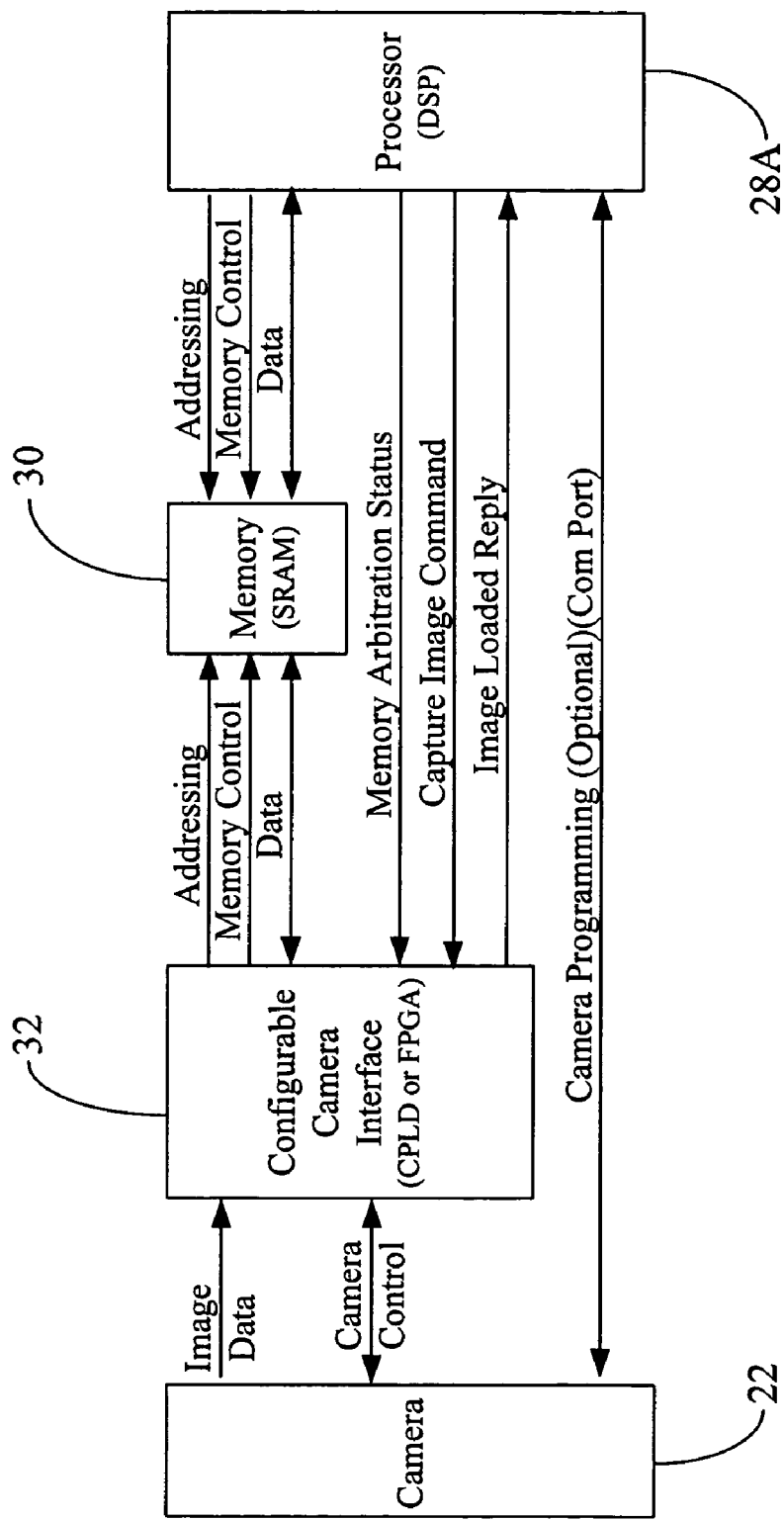
FIG. 3 shows how both the camera and the configurable camera interface are connected within the imaging system in the embodiment of FIG. 2.

FIG. 3 shows how both the camera 22 and the configurable camera interface 32 are connected within the imaging system 10 in the embodiment of FIG. 2. In the embodiment of FIG. 3, the processor 28A has minimal involvement with the camera. The processor 28A may perform only two camera functions. The first is to load any required camera parameters (into the camera 22), and the second is to initiate an image capture command and then wait for the reply (from the camera interface 32) indicating the image is captured and loaded into memory. In one embodiment, the processor uses one of two methods to program the camera. The first method is to communicate directly with the camera 22 using a dedicated comport as shown in FIG. 3. The other method is to load the camera parameters into the SRAM (Static Random Access Memory) portion of the memory 30 so that the parameters are available for the configurable camera interface 32 to download and use them to program the camera 22.

Initiating an image capture from the processor 28A may require performance of two steps. First, the processor 28A may relinquish memory control to the configurable camera interface 32. This can be accomplished using the Memory Arbitration Status line shown in FIG. 3. This enables the configurable camera interface 32 to then "arm" the camera 22 by preparing for a "Capture Image" command. For example, the flexible camera interface 32 may need to program the camera 22 at this time with parameters that the processor 28A previously loaded into memory 30. In the second step, the processor 28A may issue the "Capture Image" command to the configurable camera interface 32, which results in a command to the camera 22 to capture an image. Once an image is captured, the flexible camera interface 32 loads the image into the memory 30 and sends an "Image Loaded" reply to the processor 28A so that the processor can take back control of the memory 30 using the Memory Arbitration Status signal.

In the embodiment of FIG. 3, the process of capturing the image and loading it into the memory 30 may be accomplished with minimal involvement from the processor 28A. The architecture of FIG. 3 thus allows the camera 22 to be easily changed with minimal impact to the processor 28A, the processor software and the configurable camera interface hardware 32. In one embodiment, the configurable camera interface 32 is a software configurable CPLD (Complex Programmable Logic Device) or FPGA (Field Programmable Gate Array). Although this architecture is best suited to interfacing with generic CMOS (Complimentary Metal Oxide Semiconductor) imaging sensors, almost any CCD camera, with its supporting timing and voltage control support ICs, could also be used, as long as the CCD sensor meets the cost and size constraints of the desired system 10.

It is observed that there may be two potential advantages to using a CPLD or FPGA in the configurable camera interface 32. First, the CPLD or FPGA can be easily configured to handle the handshaking required to operate any camera and then export the data to memory 30, without processor assistance. Second, a CPLD or FPGA can also be easily configured to convert any camera output into the fixed image format expected by the processor 28A. For example, one embodiment of the invention used a camera that produced image data that was finer than required and had a format that was unusable by the processor 28A in its raw form. As a result, the CPLD was software configured to drop unnecessary lower resolution image bits and then repackage and store the image data in the data format required by the processor 28A.

Memory 30

The discrete memory 30 may be connected to both the processor 28A and the camera flexible interface 32 as shown in FIG. 3. The memory 30 may store images captured by the camera 22 and any data the processor 28A needs to store there. In another embodiment, the memory 30 may also be used to store the processor and/or configurable camera interface program (if required). However, the present disclosure does not require these programs to be stored in the discrete memory 30 (as opposed to the processor's or interface's on board memories (not shown)), but allowing this possibility enables a wider selection of processor and configurable camera interface devices.

The memory size, speed and type may be determined based on the choice of processor, configurable camera interface and the application on hand. In one embodiment, the DSP 28A has no provision for on board program storage. However, it does have large blocks of on board high speed RAM (Random Access Memory). The selected processor 28A may be designed to address the external memory 30 in 2M×16 blocks. That is, the external memory 30 may store 2M (Mega) of data words (of 16 bits each). Because the selected processor 28A may be set up to access external memory in 2M×16 blocks, the embodiment in FIG. 2 may contain 2M×16 of discrete asynchronous SRAM (Static Random Access Memory) for image storage and 2M×16 of discrete non-volatile flash memory for processor program storage. The 2M×16 flash memory may be large enough to store any processor program and the 2M×16 SRAM may be large enough to simultaneously store a dozen uncompressed VGA (Video Graphics Array) camera images. The large memory sizes may be beneficial in a research and development platform used to evaluate a large number of image processing algorithms for embedded automation applications. However, in commercial embodiments, the memory size may be smaller.

Although the processor program may be stored in flash memory, the processor 28A may copy sections of the program into the fast internal (or on-board) processor RAM or external SRAM during initialization to meet the fast image processing times. The speed of the SRAM in the memory module 30 may be a function of the application requirements. Furthermore, although in one embodiment little SRAM is required to store an uncompressed camera image, other embodiments could also incorporate image compression in the configurable camera interface 32 to further reduce the amount of SRAM used to store the camera images output by the camera 22. Several alternate viable memory technologies may also be selected based on cost and compatibility considerations. For example, the synchronous burst SRAM may be found compatible or incompatible depending on the selected processor. Similarly, SDRAM (Synchronous Dynamic Random Access Memory) and synchronous SRAM may or may not complicate the configurable camera interface 32.

Image Processor 28A

Figure 4:
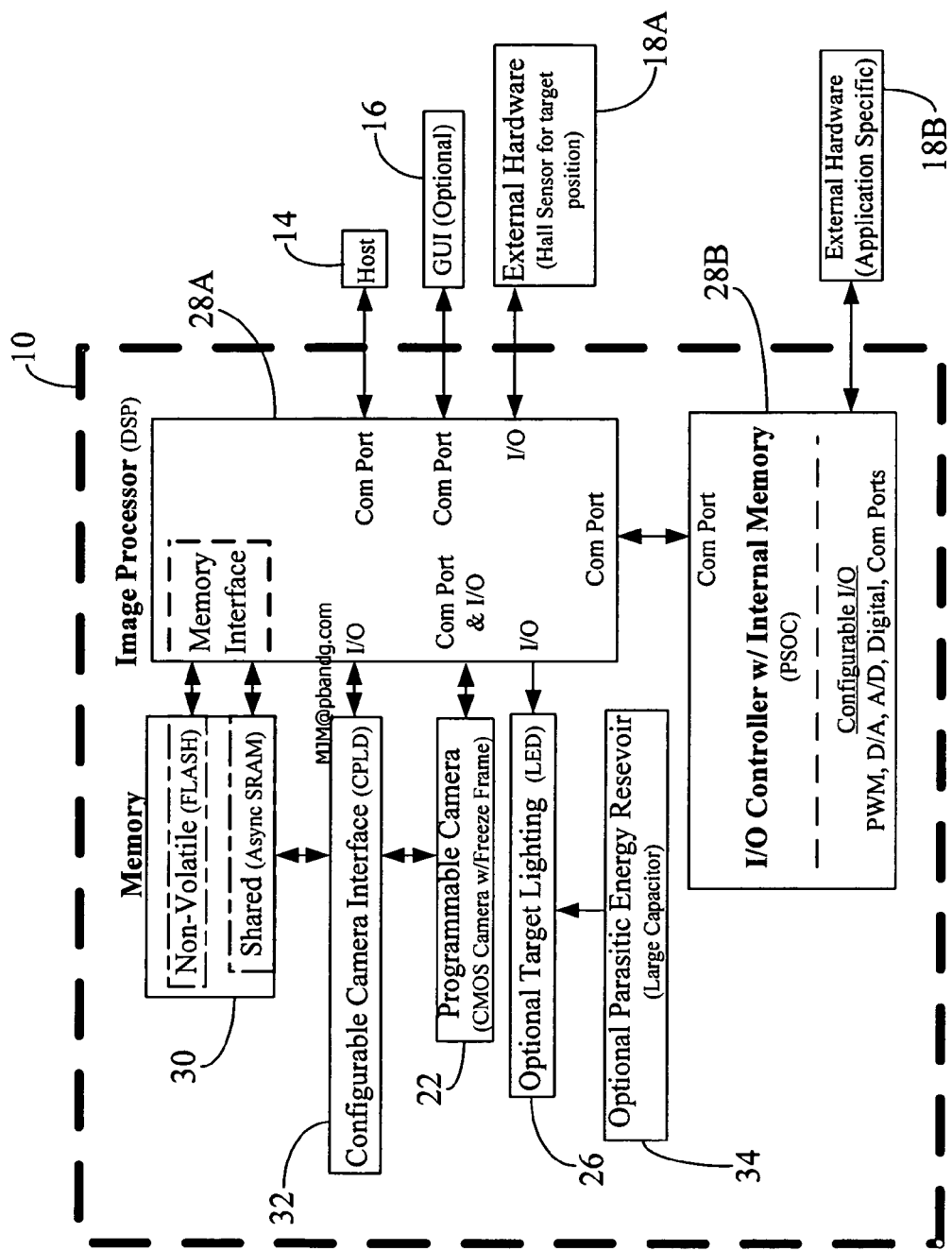
FIG. 4 illustrates an embodiment that utilizes the image processor in FIG. 2 to handle image related I/O and image processing.
Figure 5:
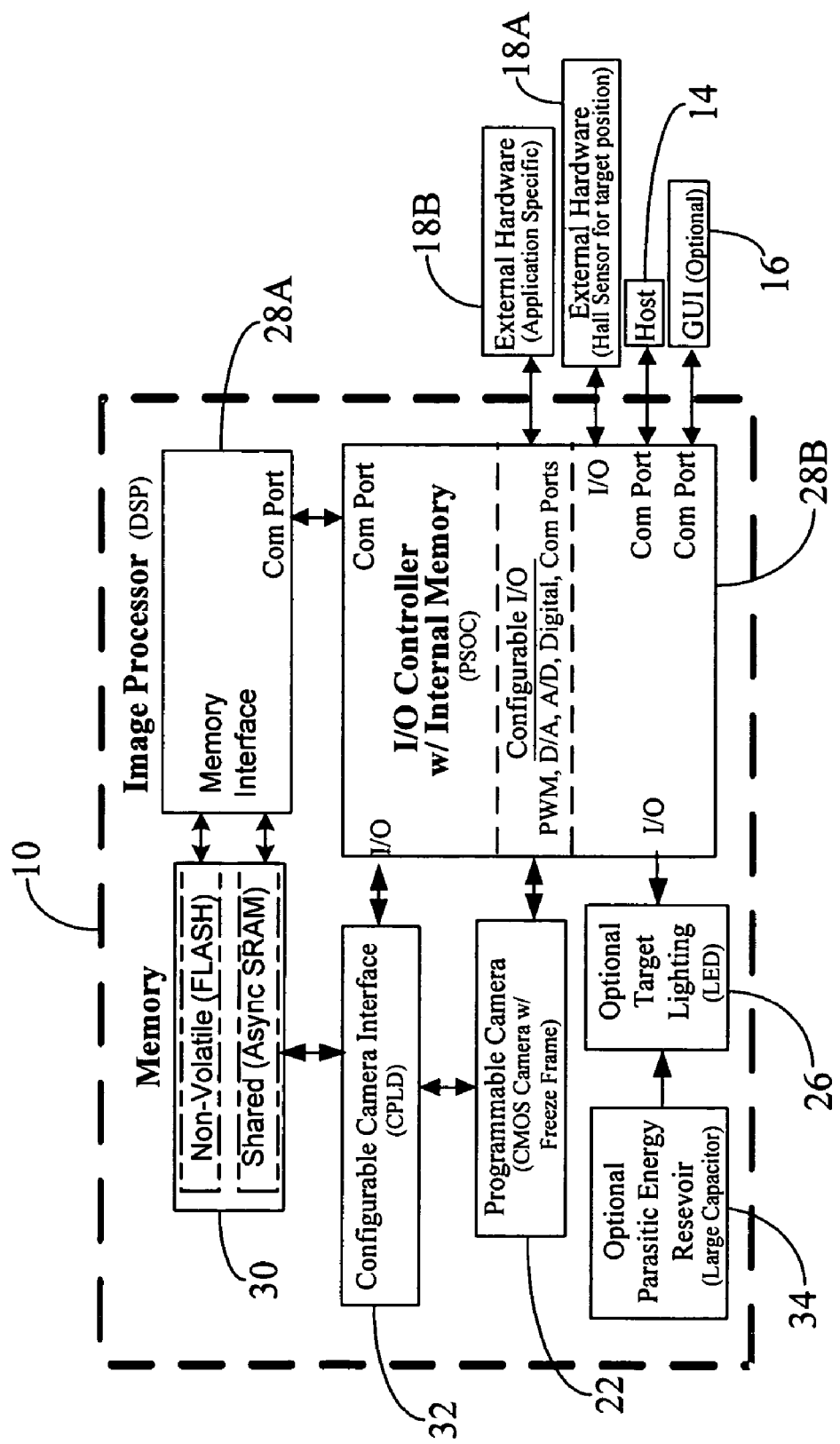
FIG. 5 shows an embodiment where the image processor of FIG. 2 has little or no I/O functionality.
Figure 6:
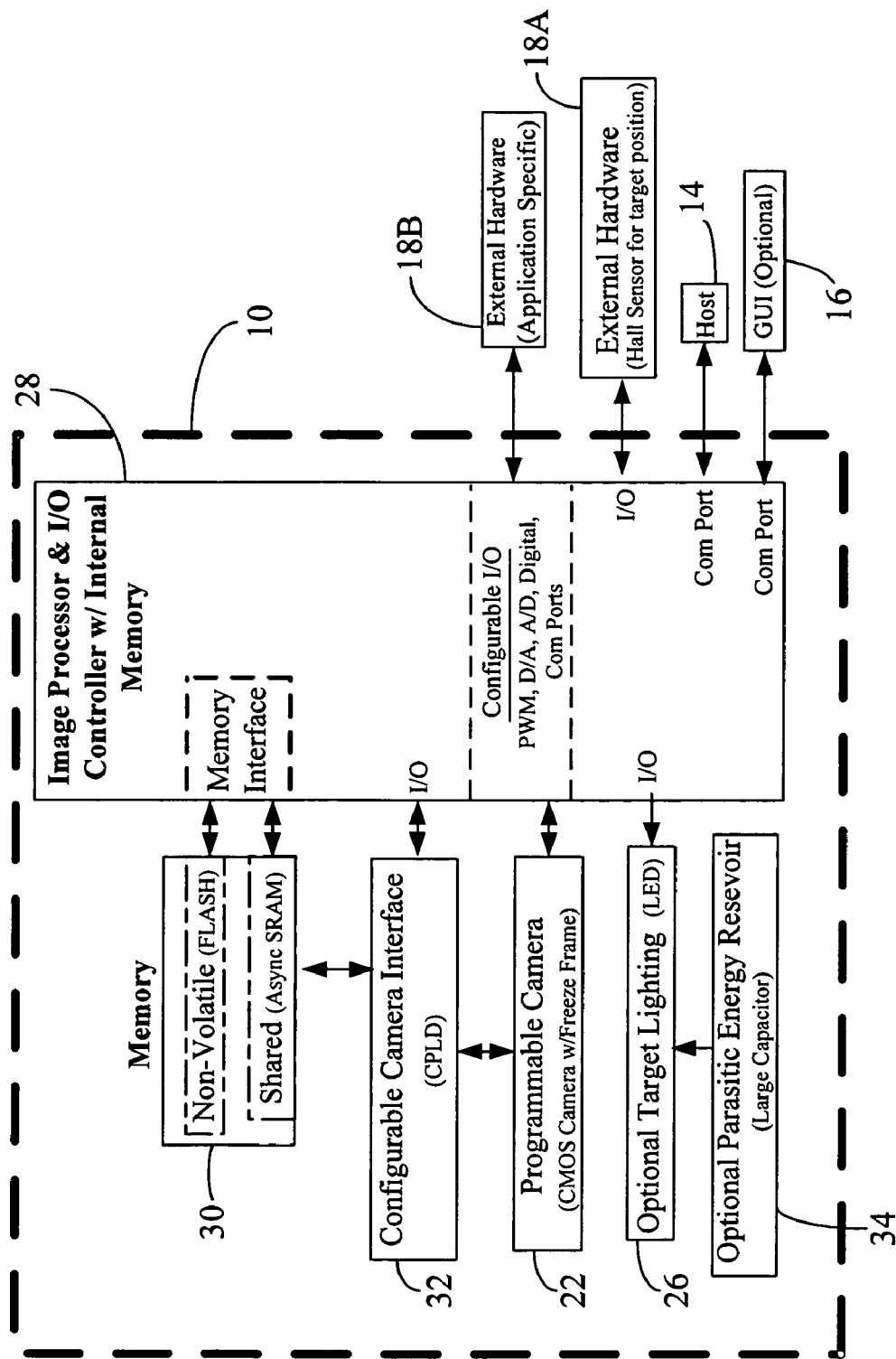
FIG. 6 shows an embodiment, similar to that shown in FIG. 1, where the image processor can handle all the image processing and post processing requirements without assistance from an external I/O controller.

The image processor 28A may perform two functions. First, it may process camera images. Second, it may also perform image related post processing tasks. It is noted that the disclosure provided herein should not be construed to be limited to the specific type of image processing or post processing task that is discussed, because the embedded imaging system 10 according to the present disclosure can be used in a wide variety of embedded vision applications (some examples of which are discussed later hereinbelow), all of them cannot be described in detail herein for the sake of brevity. Further, the method the image processor 28A may use to accomplish the image processing and the post processing tasks may be a function of the hardware that is selected to implement the embedded imaging system 10. FIGS. 4-6 show three different embodiments where each embodiment has a different utility over the others.

FIG. 4 illustrates an embodiment that utilizes the image processor 28A in FIG. 2 to handle image related I/O and image processing. It is observed here that the embodiment illustrated in FIG. 4 is substantially similar in architecture to that shown in FIG. 2, where a separate I/O controller 28B is used to process non-image related I/O commands and tasks generated by the image processor 28A. In the embodiments of FIGS. 2 and 4, the image processor 28A is connected directly to the host 14 and/or a GUI 16 to enable direct host or GUI access/control of the image processing functions. After the image processing is complete, the image processor 28A may communicate a set of post processing commands to the I/O controller 28B, which the I/O controller may then execute. The embodiment in FIG. 4 has enough image processing power and I/O controller flexibility to handle a wide array of embedded vision applications by changing only the software and the external devices connected to the embedded imaging system 10.

The embodiment shown in FIG. 4 was constructed and tested to inspect pharmaceutical pills for fragmentation. The amount of fragmentation was determined by counting the number of image pixels that fell within a pre-determined color or gray scale range and comparing the number to an acceptable minimum. If the count was too low, it meant that the pill had unacceptably large amount of fragmentation. If the pill fell within expected parameters, the image processor 28A post processing algorithm commanded I/O controller 28B to direct the pill to a "good pill" location. If the image processing determined the pills fell outside the expected criteria (including pill quality criteria), then the post processing algorithm commanded I/O controller to move the object to a "pill rejected" location. In either case, the post processing algorithm also sent the pill images to a host 14 for archival storage and kept a running tally of the number of accepted and rejected pills. The embodiment in FIG. 4 may also be used to inspect other pill parameters by changes or additions to the image processing software described above. For example, a multiplicity of software algorithms for determining pill shapes and identifying features already exist, and one of these algorithms may be coded into the image processing software. Alternatively, a new software algorithm may be devised to accomplish the same task.

FIG. 5 shows an embodiment where the image processor 28A of FIG. 2 has little or no I/O functionality. All I/O may be handled by the I/O controller 28B. An example of this embodiment would be the mating of a user selected DSP core with a microprocessor, microcontroller, PSOC (Programmable System On a Chip), ASIC, or FPGA. It is observed that the PSOC may be obtained from Cypress Semiconductor in Lynnwood, Wash. In this example, the DSP core has only enough I/O to interface to the FPGA, PSOC, ASIC, microprocessor, or microcontroller. All of the image processing would occur in the DSP (image processor 28A) and all of the image post processing decisions and commands would be generated in the DSP. However, in this embodiment, the DSP commands the I/O controller 28B, via the DSP to I/O controller connection, to perform any I/O tasks that are required because the DSP 28A lacks the on board I/O necessary to accomplish these tasks without assistance.

FIG. 6 shows an embodiment, similar to that shown in FIG. 1, where the image processor 28 can handle all the image processing and post processing requirements without assistance from an external I/O controller. For the sake of clarity, the image processors in FIGS. 1 and 6 are designated by the same reference numeral "28." An example where the embodiment in FIG. 6 may be used is in the inspection of parts moving on a conveyor belt. If the image processor 28 determines that the part is bad, only a single digital I/O bit is required to activate a flipper and place the bad part into the trash bin. This is an example of an application where an image processor can be selected which can handle both the image processing and all of the I/O controller functions. It is noted that the architecture shown in FIG. 6 may be easily scaled up to cover even the most complex applications by simply altering the selection of the silicon device designated by the reference numeral "28." For example, a selection of the Altera Stratix 2 FPGA with Nios softcore IP technology (part number EP2S 180) for silicon device "28" would place 96 separate DSPs and up to 1000 separate microprocessors all on a single piece of silicon, thereby affording a significant image processing and I/O control capability.

The selection of the image processor (28 or 28A depending on the configuration selected) is application specific. A partial list of some of the considerations includes: (1) the type of required image processing; (2) the required image processing speed; (3) memory interface criteria; (4) the number and type of available general purpose and communications I/O; (5) the amount and type of image processor's on board memory; (6) the availability and type of development tools; and (6) cost.

I/O Controller 28B

Both camera control and object motion control may be performed by I/O controller hardware which can reside in the image processor 28 (as in the embodiments of FIGS. 1 and 6), or in a separate I/O controller module (e.g., the I/O controller 28B in the embodiment of FIG. 5), or be split between the image processor 28A and a separate I/O controller module (e.g., the I/O controller 28B in the embodiments of FIGS. 2 and 4). In most applications, the selected image processor 28A may not have enough I/O capability and a separate I/O controller 28B may be required to supplement the I/O capability of the image processor 28A. Another consideration for selecting a separate I/O controller block may be the desirability to maintain a true, real-time I/O control. If the image processor and the I/O controller functions are run out of the same processor core, then the processor time must be shared. In some applications, this can lead to an undesirable I/O control outcome where an I/O response did not occur fast enough.

The selection of the I/O controller 28B is usually application driven. For example, assume that the embedded imaging system 10 is part of a machine used to inspect parts moving on a conveyor belt and initiate a good/bad output bit that is used to push bad parts into a trash bin. In this example, the I/O controller 28B may be required to turn on and off the motor that is running the conveyor. The I/O controller 28B may even implement some operator safety interlock functions using simple combinational logic or a PAL (Programmable Array Logic) device. Conversely, assume that the application is to create an embedded imaging device for general purpose automation applications. In this example, the I/O controller 28B must be versatile enough and powerful enough to cover a wide variety of applications. The I/O controller 28B should probably include a large multiplicity of configurable I/O to supplement any I/O capability that the image processor 28A may possess to enable the embodiment to be used in a large variety of applications. The I/O controller should probably have a lot of digital I/O for sensor and interface control, multiple D/A and A/D for sensor interface, provisions for controlling motors using PWM pulses, and a multiplicity of different types and number of communications ports. In this example, a good choice for an I/O controller 28B may be a PSOC (Programmable System On a Chip) I/O controller, manufactured by Cypress Semiconductors of San Jose, Calif. This PSOC I/O controller has a multiplicity of the following types of I/O: configurable digital inputs and outputs, RS-232 communication ports, RS-485 communication ports, I2C communication ports, SPI (Serial Peripheral Interface) communication ports, configurable input and output D/A (Digital to Analog) converters, configurable input and output A/D (Analog to Digital) converters and configurable PWM (Pulse Width Modulated) outputs. All of the I/O functions are user selectable and programmable.

As mentioned hereinbefore, the embedded imaging system 10 may be used to inspect and disposition pharmaceutical pills. In that case, the I/O controller 28B may communicate with the image processor 28A using an SPI communications port. The I/O controller 28B may have an on-board microprocessor and internal memory that enable it to execute control programs initiated by commands from the image processor 28A. Some of these control programs may be executed pre-image processing, some may be executed concurrent with the image processing and some may be executed post-image processing. For example, one of the controller programs may output and monitor various camera reference voltages. A second control program may output PWM signals to control the motors that move the pills. A third control program may use digital outputs to command external hardware to move pills into dispense or reject bins, based on the image processing results.

Lighting Unit 26

It is observed that many embodiments of the imaging system 10 either incorporate lighting and/or have provisions to control external lighting. The lighting unit 26 is preferable because a fast camera shutter speed is required to prevent motion-related image distortion when the object (e.g., a pill) is moving fast and most cameras do not have sufficient light sensitivity to capture an image using a fast shutter speed unless additional object lighting is added. In one embodiment, the lighting is controlled by image processor I/O (as shown, for example, in FIGS. 1, 2, 4, and 6) or by a separate I/O controller module (as shown, for example, in FIG. 5). In one embodiment, the light intensity of the lighting unit 26 can also be adjusted and it may be insured that the light is on the full time that the image is being captured. The light source 26 may also be self-calibrated by the imaging system 10 upon system start-up. The easiest way to perform a lighting self calibration is to use a target. Upon power up, the camera may continuously image the target, adjusting the light intensity and/or the shutter speed up or down each time until the proper lighting level were achieved. The proper lighting level would correspond to the result that gives the best image of the target when compared with a library image (of the target). One way to accomplish this is to compare the lightness and darkness of specific points on the calibration-time target image with the same points taken from the library image (of the target). The target should preferably be small enough so that during normal system operation, the target would be completely covered by the object being imaged. Some of the factors affecting the required magnitude, duration and spectra of the lighting are the camera light sensitivity, the camera shutter speed, the distance of the camera to the object and the distance of the light to the target.

Parasitic Energy Reservoir 34

Some embodiments of the embedded imaging system 10 may include a parasitic energy reservoir 34. The parasitic energy reservoir 34 may insure that the vision system 10 does not draw more power than the input can deliver without creating a fault condition. Second, the reservoir 34 may provide supplemental energy when the vision system 10 requires more energy than the input power source can deliver. The method of constructing the parasitic energy reservoir 34 may be application specific. For example, in a pill counting and sorting embodiment, the optional parasitic energy reservoir 34 may be incorporated as part of the imaging system 10 because the peak power requirements of the embodiment may exceed what the input power source can deliver. For example, when a USB (Universal Serial Bus) port, which delivers a maximum of 2.5 W, is used as the input power source, the 2.5 watts of power is sufficient for most functions that the imaging system 10 performs. However, to capture images, the imaging system 10 temporarily turns on a high intensity light (using, for example, the optional lighting unit 26). In one embodiment, when the light is on, the total required power exceeds 6.2 watts. In that case, 6.2 watt power requirement may be met by using the optional parasitic energy reservoir 34 to provide supplemental power for the short time that the light is on. When the light is off, low levels of parasitic energy are drawn from the low output power source to trickle charge the very large energy reservoir 34. Because the time that the light is on may be very short (e.g., 140 microseconds or so), and because the total duty cycle of the light pulse (from the lighting unit 26) may also be very small (e.g., around 0.22%), it is possible to completely recharge the parasitic energy reservoir 34 in the time between each use of the light.

Figures 7A, 7B:
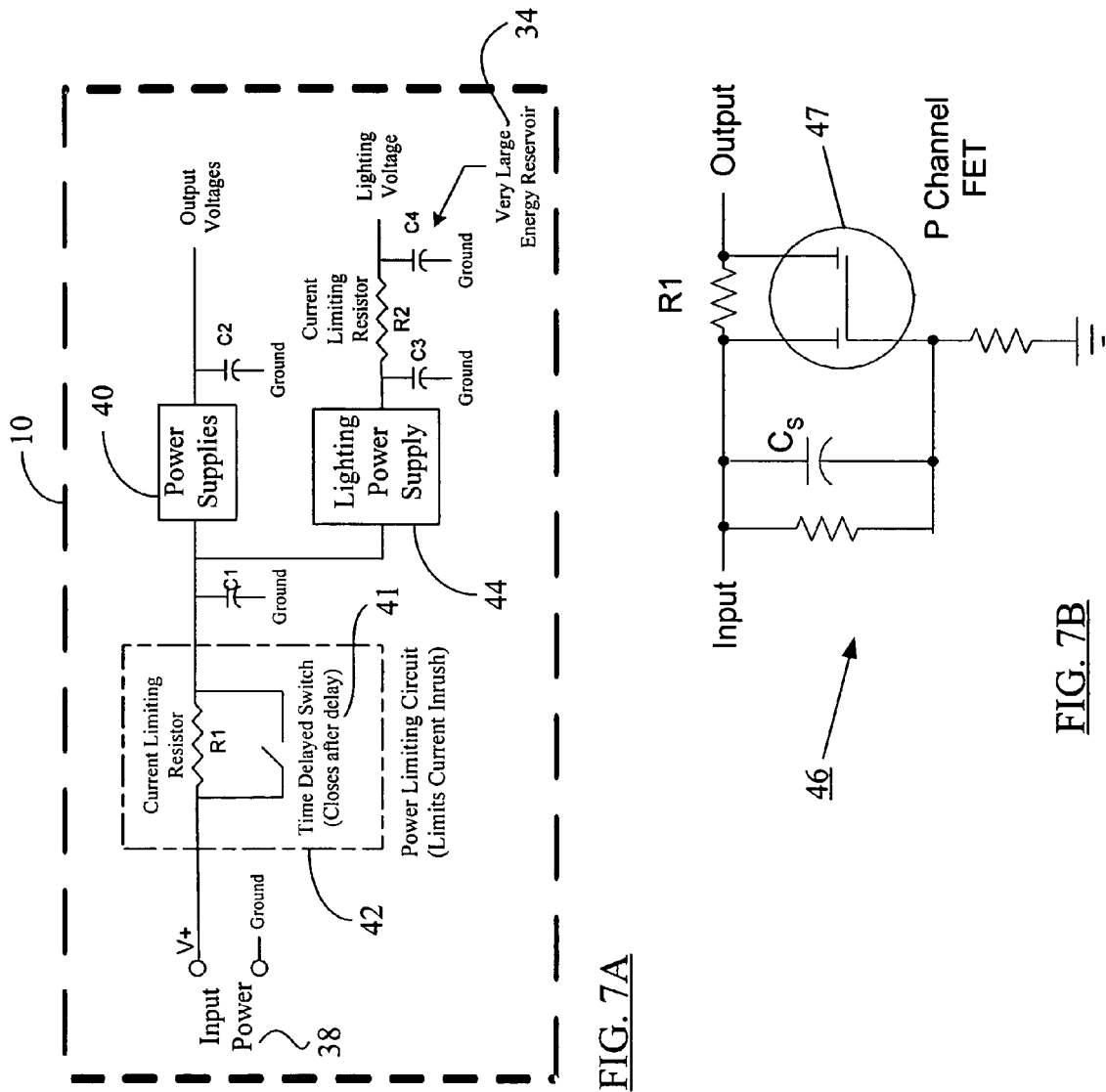
FIG. 7A illustrates how the optional parasitic energy reservoir may be implemented in one embodiment of the embedded imaging system in FIG. 1.
FIG. 7B shows an exemplary P-channel FET switch that may be used in the circuit configuration of FIG. 7A.

The imaging system 10 may also draw more power than the USB can supply when it is first connected to the power source. This may be because the system 10 is trying to charge internal circuits as fast as possible. This problem may be solved by employing circuits that slow the charge time of the electronics when power is first applied. FIG. 7A illustrates how the optional parasitic energy reservoir 34 may be implemented in one embodiment of the embedded imaging system 10 in FIG. 1. The only electronics shown in FIG. 7A is power related. Circuits showing the camera 22, image processor 28, configurable camera interface 32, memory 30 and optional lighting unit 26 have all been removed. Only circuits relating to the flow of power are shown.

In the embodiment of FIG. 7A, a USB port is utilized as the input power source 38 to deliver a maximum of 500 mA. However, the power supplies 40 used in the embodiment of FIG. 7A initially required more than 500 mA, when the input power is connected, because the power supplies have input capacitors (represented by "C1" in FIG. 7A) that needed to be charged. Without some type of power limiting circuit (e.g., the circuit 42 in FIG. 7A discussed below) between the input power and the power supply inputs, the embodiment would draw much more than the 500 mA the USB can deliver. This would cause the input power source (the USB) to declare a fault condition and stop delivering power. Therefore, three power limiting circuits are employed in the embodiment of FIG. 7A.

The first power limiting circuit 42 may be connected between the input power source (USB) 38 and the imaging system's 10 power conversion and distribution circuits (the power supplies 40). This circuit 42 uses a single resistor (R1) to limit the current the imaging system 10 can draw when the power source 38 is connected. Although the resistor R1 limits the input current, it also enables the power supply input capacitors (represented by C1) and other power related circuits to charge. After a period of time consistent with the charging requirements of C1 and the power supplies, a switch 41 (in the limiting circuit 42) closes, shorting out the current limiting resistor (R1) as shown in the configuration of FIG. 7A. After the switch 41 is closed, C1 and the power supplies 40 may continue to draw power, but they will do so at a rate that will preferably not exceed the maximum that can be delivered by the input power source 38. Shorting out the resistor R1 may be necessary to insure that both the full current and the full voltage are available as the input to the imaging system 10. FIG. 7B illustrates an exemplary switch configuration 46 for the switch 41 shown in FIG. 7A. A P-Channel FET (Field Effect Transistor) switch 46 in FIG. 7B may be used as the switch 41 in FIG. 7A to short out the resistor R1. The closing delay may be accomplished by placing a capacitor Cs (shown in FIG. 7B) in the FET bias circuit in FIG. 7B. The input power source 38 may charge the timing capacitor Cs in the FET bias circuit, which would cause the FET 47 to turn on and short out the resistor R1 after a predetermined amount of time. In one embodiment of FIG. 7B, the P-channel FET 47 is the FET with part number IRWL6401, the capacitor Cs has a value of 4.7 mf, the resistor between the gate of the FET 47 and the ground is of 1kΩ, the resistor in parallel with Cs is of 10 kΩ, and resistor R1=10Ω, ½ W.

A second type of power limiting circuit ("soft start") (not shown) typically exists inside each power supply 40 if supplies with this feature are selected. However, the power supply soft start circuits may not affect the amount of power going to the supply input capacitors (C1). This is why the power limiting circuit 42 that uses R1 may be required. However, the power supply soft start circuits (not shown) can control the amount of power sent to everything on the power supply outputs, including the capacitors represented by C2-C4. The limiting circuits (not shown) in the power supplies 40 may be programmed: (1) To insure that the supplies 40 did not start producing power until after the power supply input capacitors (C1) were fully charged. The input capacitors need to be charged to insure the supplies work properly. (2) To insure that everything on the outputs of the power supplies 40 would charge at a rate that did not exceed the input power source (e.g., a USB source) capability.

The third power limiting circuit is represented in FIG. 7A as a resistor (R2) placed between the large energy reservoir 34 (represented by C4) and the lighting power supply 44 that feeds the reservoir 34. This power limiting circuit (R2) may insure that any load placed on the energy reservoir 34 will not result in an excess current draw upon the input power source 38. Furthermore, R2 may also serve the function of constantly replenishing the energy reservoir 34 when parasitic energy is available. However, it is preferable to insure that R2 is small enough so that the energy reservoir 34 can be recharged fast enough to meet the required duty cycle of the lighting unit 26 (as discussed hereinbefore), while at the same time insuring that R2 is not so small that the result is an unacceptably high current demand on the input power source 38.

The reservoir 34 can be any energy storage device (such as a battery or a capacitor (e.g., the capacitor C4 in FIG. 7A)) that can provide supplemental energy when the embodiment requires more energy than the input power source can deliver. A special purpose capacitor (e.g., the capacitor C4) that has a very high farad rating and a very low series resistance may be used as the energy reservoir 34. These properties may be desirable so that the device can deliver very large current pulses in a very short amount of time. Most large capacitors and batteries produced today have an internal resistance that is too large to deliver the required current in embedded vision applications where the energy discharge cycles are in the 100 microsecond range. Therefore, care must be taken when selecting the size of the energy storage device to insure that it is large enough so that the reservoir voltage does not drop to an unacceptable level, while it is delivering power, due to charge depletion.

It is seen from the foregoing discussion that the embedded vision system 10 in FIG. 1 is more than just an image sensor or digital camera; it is a real time, embedded vision system that meets the following three criteria: 1) All of the vision capture, vision processing, I/O controller and I/O interface hardware in the vision system can fit inside a package that is small enough to reside inside most machines that would employ such a device. 2) All of the image capture and processing as well as all the I/O processing and I/O control can be performed in real time. 3) The embedded vision system is able to run off the available power (e.g., a USB source). These three criteria are discussed in more detail below.

Small Size

The smart camera sensors (not shown) discussed hereinbefore under the "Background" section may fail to meet this requirement because the smart camera sensor systems overemphasize the image capture and processing hardware at the expense of the I/O control and interface hardware. Smart camera sensors, such as those manufactured by DVT Sensors, being primarily vision sensors, employ very high speed, high quality camera sensor systems and very powerful image processing hardware that is selected based on the ability to meet any image capture and image processing requirement. The image capture and processing capabilities of smart camera sensors typically far exceed both the vision related technical requirements and system cost budgets for most embedded vision applications. Smart camera sensors devote too much cost, hardware and physical space to meeting the image capture and processing requirements at the expense of I/O control.

Smart cameras have 8 bits of I/O, but the function of this I/O is to help the sensor know how and/or when to process the information and/or to assist with reporting the outcome of the processing. For example, one of the digital I/O bits can be configured to trigger the camera to take an image. A second bit can be used to report a "good" result and a third bit can be used to report a "bad" result. Connecting these output bits to external hardware does not qualify this sensor as having control capability any more than connecting a hall sensor switch to a counter does. A hall effect sensor is a sensor that reports its results as a digital output. Either an object is in the hall field or it is not. In a similar fashion, the DVT camera is a sensor that also reports its result as a digital output. Either the camera image is good or it is not. Both the hall switch and the smart camera can provide a trigger for a controller or activate a solenoid, but they are still simple sensors, not I/O controllers. The system 10 according to the present disclosure is, on the other hand, a sensor as well as an active controller as discussed hereinbefore. The DVT Sensor literature states that the smart cameras are designed to interface with external controllers, such as a PC and PLC (Programmable Logic Controller), using a field bus or an Ethernet connection. Unlike older cameras that can provide only streaming analog or digital outputs, the smart cameras are designed to process the image and provide a result in a simple digital format. They can even provide empirical imaging data (like the location of an object in an image), for those external controllers that are able to interrogate the sensor, interpret the data stored in the sensor internal registers, and then externally perform any required command and control of external hardware using the Ethernet or field bus communication port.

In contrast, the imaging system 10 is a different type of vision system. It is a truly embedded vision system with real time image capture, processing and I/O control capability. The concept of shrinking an old PC-based vision system, and calling it a smart camera sensor, has not been employed to construct the imaging system 10. In the imaging system 10, the image capture and image processing requirements have been drastically scaled down so that they are more consistent with what most embedded vision systems would require. The result is that the image capture, image processing, and I/O controller hardware in the embedded system 10 occupies less space and costs an order of magnitude less than a smart camera sensor and associated PC or PLC controller. This space saving was required to insure that dedicated, embedded real time I/O control and interface hardware (including, for example, the constituent elements of the imaging system 10 in FIG. 1) could be fit inside a product (e.g., the product 12 in FIG. 1) and still keep the overall size small enough to meet most embedded applications. In one embodiment, a second I/O processor (PSOC or microcontroller) (not shown) may be added. The I/O processor (represented by the I/O controller 28B in various figures) may provide a multitude of internally configurable digital I/O, analog I/O and communications ports. No external controller processor, controller hardware and/or I/O translation hardware may be required. The entire vision system 10 thus has the technical ability, small size and low cost required to meet most embedded vision applications requiring real time image capture, image processing, I/O control and I/O interface. Smart camera sensors fail this requirement.

Real Time Image Capture and Control

Smart camera sensors provide quasi-real time I/O control. In contrast, the I/O operations in the imaging system 10 according to the present disclosure are in real time. A difference between the two devices is that the imaging system 10 may employ a dedicated I/O controller and I/O interface (e.g., the I/O controller 28B in FIG. 2). A smart camera sensor, on the other hand, cannot employ a dedicated I/O controller that would permit real time I/O control and interface without a total concept redesign because it is incompatible with the available space, software structure, hardware and hardware interfaces with which a smart camera sensor is used. As noted before, smart camera sensors have 8 bits of image processor I/O available. All the other I/O data resides in the internal registers of the image processor (not shown) in the smart camera sensor. All I/O must be accessed via a multi-threaded program. A smart camera sensor cannot simultaneously process I/O control process and image data since both tasks must be performed in the same processor. For example, suppose it is necessary to output I/O data stored in one of the image processor registers in the smart camera sensor. The data must first be accessed via a multithreaded program which may be temporarily tied up performing an image capture or processing task. Then the data must be converted to useable I/O signals using external Ethernet compatible I/O translation hardware.

In contrast to a smart camera sensor, the embedded imaging system 10 according to present disclosure employs a flexible and real time I/O control. At any time the image processor 28A, a host 14 or a piece of external hardware 18 can initiate an I/O command or signal to the I/O controller 28B. The dedicated I/O controller 28B may be configured to perform immediate, real time processing of this I/O input or command. Unlike the smart camera sensor, there is no need in the embedded vision system 10 for conflict between I/O control tasks and image capture or image processing tasks. Unlike the smart camera sensor, the dedicated I/O controller 28B may contain a plethora of available on-board hardware configurable I/O devices so that it may not be required to have a delay while the data is translated from one format (e.g., an Ethernet protocol) into another (e.g., the I/O output). A partial list of the available I/O in the vision system 10 includes digital I/O, D/A I/O, A/D I/O, PWM output, RS-232, RS-485, I2C and SPI.

Operation on Available Power

Embedded devices may frequently run off parasitic or limited power. Although the smart camera sensor and the embedded imaging system 10 of the present disclosure handle this requirement in two different ways, both devices meet the requirement. As discussed before, the smart camera sensor meets this requirement by selecting Ethernet as both the host interface and the power source. Since the Ethernet power standard permits a device to draw 12.95 watts, the smart camera sensor has enough available power to meet any power requirement. In contrast, the embedded imaging system 10 uses an optional energy reservoir 34 (as discussed hereinbefore) that can be charged from parasitic power. This enables the embedded vision system 10 to work with much more miserly power sources, such as USB, as well as with large capacity energy sources, such as Ethernet.

Pill Counting and Dispensing

Figure 8:
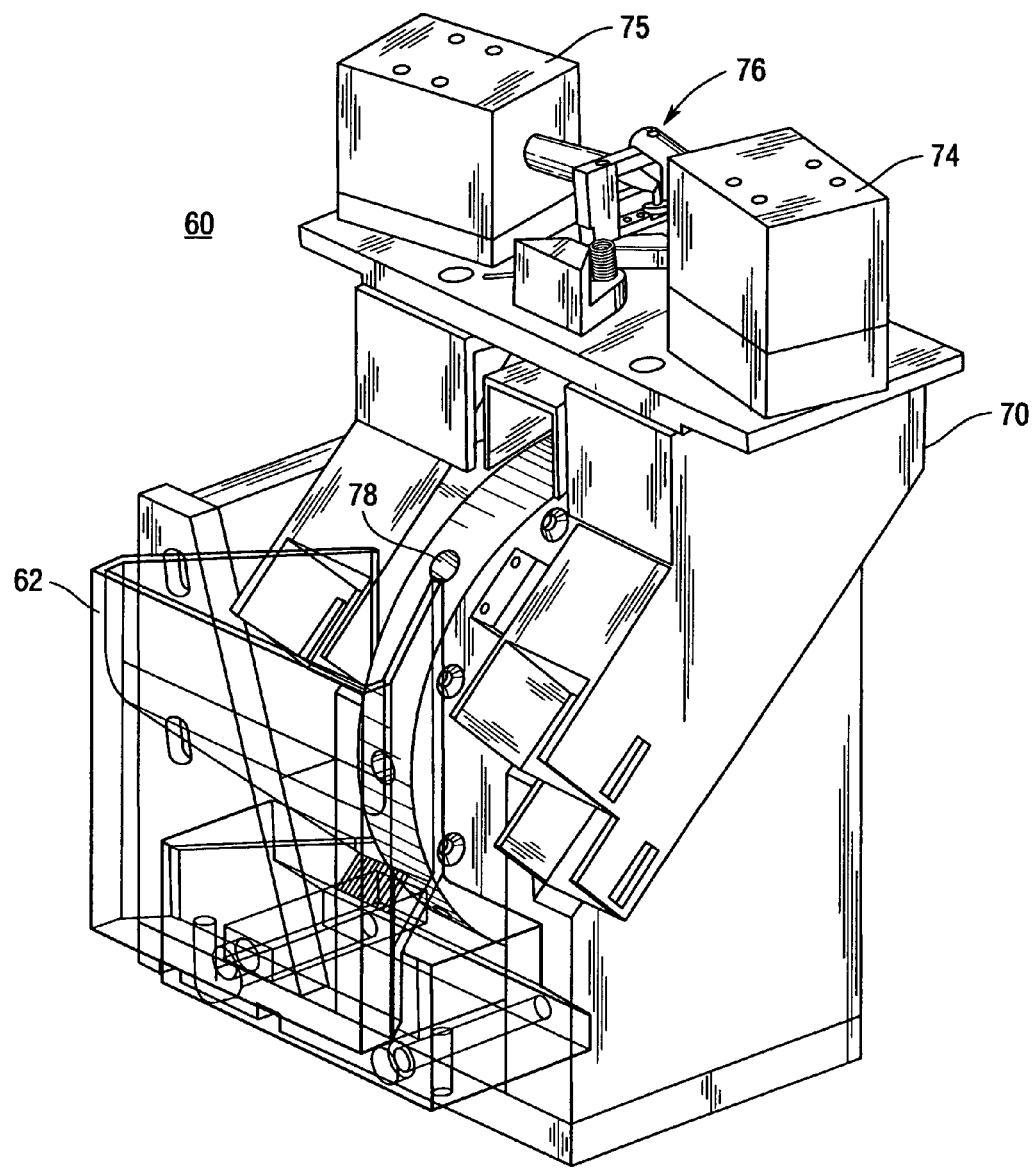
FIGS. 8 and 9 illustrate embodiments of a pill singulating device and counter, together with portions of a hopper containing items to be singulated and counted, in which an embedded imaging and control system constructed according to the teachings of the present disclosure may be used.
Figure 9:
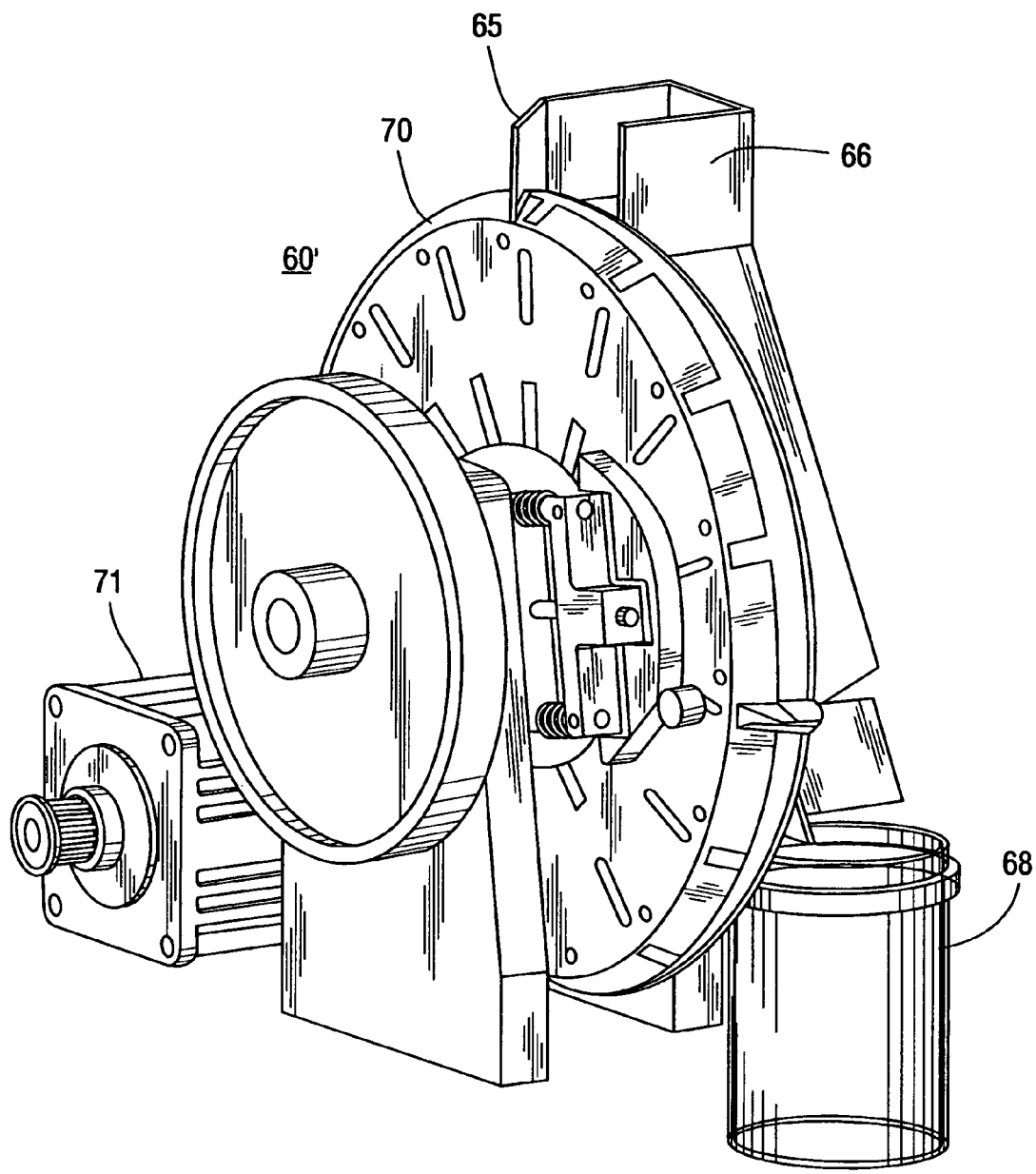

FIG. 8 illustrates one type of a singulating device and counter 60 (which may be analogized to the product 12 shown in FIG. 1). The singulating device and counter 60 is used in conjunction with a removable hopper 62, a portion of which is shown in phantom in FIG. 8. Another embodiment of a singulating and counting device 60', with the outer housing and hopper removed, is illustrated in FIG. 9. In FIG. 9, a scraper 65, a main or dispensing path 66 and an end user container, e.g. vial 68, are also shown. Seen in both FIGS. 8 and 9 is a hollow, rotatable singulating disc 70 having a plurality of openings around the periphery thereof. Two versions of the disc 70 are illustrated, one in FIG. 8 and the other in FIG. 9. The reader should be aware that the profile of disc 70, i.e. the shape around the periphery when viewed from the side, may take several shapes, e.g. flat, curved (convex or concave), etc. or some combination, e.g. convex portion tapering to a flat portion.

Shown in FIG. 9 is a source of rotary motion, such as motor 71, coupled to the singulating disc 70 by a belt (not shown) via a pulley (not shown) and shaft (not shown). A vacuum source (not shown) is also coupled to the singulating disc 70. The devices of FIGS. 8 and 9 focus on the singulating and counting of medicaments (pills, gel caps, tablets, etc.) although other items could be singulated, such as seeds, candy, etc. and, optionally, counted. Because the dispensing of medicaments is often performed based on a prescription, counting often accompanies singulation, although singulation could be performed without counting. Further, dispensing of singulated, counted medicaments is usually performed in conjunction with a bottle or vial, although singulated items, counted or uncounted, could be dispensed to a movable belt or other device for further processing or for transport to another location, e.g. singulated candy moved to a wrapping station.

Referring back to FIG. 8, the singulating disc 70 has a portion thereof, substantially around the 7 to 9 o'clock position, which rotates through the removable hopper 62. Also shown in FIG. 8 is a first solenoid 74 and a second solenoid 75 which act upon a spring-loaded diverter 76 located at approximately the 11-12 o'clock position on the singulating disc 70. The operation of the spring loaded diverter 76 may be under the control of the system 10 of FIG. 1.

In operation, the device for singulating and counting 60 uses negative pressure to singulate and count a multitude of differently shaped and sized pills without requiring calibration for each shape and/or size. The hollow singulating disc 70 is vertically carried by the housing. The disc has a number of holes or openings 78 around its periphery. A vacuum is pulled though the holes by a pump which is connected to a hollow shaft, which is connected to the inside of the hollow singulating disc 70. Pills placed in the hopper fall, via gravity, to the bottom of the hopper to contact the periphery of the spinning disc substantially in the 7 to 9 o'clock position. The vacuum available at each of the holes causes a pill to attach which is held there while the disc rotates the pill upwards in a clockwise direction as seen in FIG. 8. At the top, approximately the 11 to 12 o'clock position, the spring-loaded diverter 76 may direct the items off the disc 70 into one of two paths, a reject path and a return to hopper path, depending on the result of an inspection, e.g., fragment detection, pill identification/verification, etc., and count performed by system 10 of FIG. 1, or may allow the items to remain on the singulating disc 70. Items that make it past the spring-loaded diverter 76 are removed by scraper 65 so as to fall into dispensing path 66. The motor used to rotate the singulating disc 70 as well as the vacuum source may be under the control of the system 10 shown in FIG. 1. An optional light source may be present which could also be under the control of the system 10 shown in FIG. 1.

Thus, as seen, the imaging system 10 according to the present disclosure may be embedded in a pill counting and sorting machine to process an image of the pill, use the image to make a decision about whether the pill should be dispensed or not and control all the other aspects of machine operation, which include host interface and all aspects of pill motion control. The integrated unit may also perform pill counting and discard fragmented or "bad" pills based on the real time processing of the pill's image. Additional applications of such embedded imaging system include, for example:

(1) Identifying fragmented pills, in real time, and quantifying the amount of fragmentation.

(2) Examining pills in real time and assigning a probability that each pill is the correct medication. This probability would be assigned by matching the pill color, size, shape and any identification markings with information (obtained from one or more "standard" or "ideal" pills) that exists in a data base.

(3) Providing a means of only counting and dispensing good pills because the I/O controller 28B may command bad pills to be disposed of. Thus, only pills of specific quality will be counted, rather than counting all pills regardless of pill quality.

(4) Snapping pill images and sending them to a remote location (e.g., the host computer 14). This enables a remote pharmacist to examine and verify if the pills are the correct medication.

(5) Complying with health laws. Some state laws require that an image of the medication appear on the label of the pill container. Current machines accomplish this by printing a library or "stock" image of the medication. This means the data base (of such stock images) must be updated every time a new drug is added to the system. If a generic is used, care must be taken to always use a generic from the same manufacturer because the same exact generic may look different if it is purchased from a different supplier. If the correct image is not in the image database, that pill cannot be dispensed. This can be a problem because new drugs or generics frequently arrive before their image database is made available. The imaging system 10 according to the present disclosure may therefore be used to locally create a pill image for the database, thereby speeding the introduction of new drugs or generics into the distribution system.

(6) Enabling the user to collect statistical data (about pills) that relates to quality control. The pharmacy can statistically build up an expected pill rejection rate for each medication and the imaging system 10 may be configured to alert a user when something is out of bounds. For example, an increased rejection rate might mean the dispensing machine needs to be cleaned. The user may also learn when a particular lot of pills has an uncharacteristically high amount of fragmentation.

(7) Controlling the pill dispenser. As discussed before, a dedicated I/O controller 28B may be used to perform all the functions of the dispensing system's existing hardware so as to carry out all of the machine control and host interface functions.

(8) Expanding pill dispenser capabilities with little or no cost impact. The embedded imaging system 10 may be a low cost solution that can do more than add vision capability to a pill dispenser. It can also replace the existing dispenser hardware that performs the machine control and host interface functions. As a result, the vision capability can be added at little or no extra cost.

(9) Functioning as a machine feedback control sensor in addition to functioning as a pill inspection device. One example of this application is to place the vision system 10 at the end of a robot arm (not shown) in a pill dispenser to provide arm position feedback and control. In this application, one low cost embedded vision system (such as the system 10 in FIG. 1) could replace multiple expensive optical encoders and the motion controller. The DSP 28A in the vision system 10 may be configured to perform the real time matrix calculations required to carry out simultaneous multi-axis robotic arm movements. In addition, there is no tasking conflict between performing the robotic arm calculations (which are required when the arm is moving) and the pill imaging calculations (which occur when the arm is at rest).

Embedded Applications

The imaging system 10 according to the present disclosure miniaturizes and combines real time image capture, real time image processing and real time I/O control. As a result, vision-based processes can now be added to or placed inside devices that were previously too small to enable the addition of these features. The vision system 10 can be employed in deeply embedded applications, which makes it possible to design a broad range of new products including, for example:

An embedded or handheld visual inspection system with real time image capture, image processing and I/O control. An exemplary visual inspection system is a hand held pill discrimination system. In this example, a pharmacist would place a pill, requiring identification, on the table. He would then hold the device (having the vision system 10 embedded therein) (not shown) over the pill and slowly raise and lower the device while aiming the image sensor 10 at the pill. The device may employ a sonar sensor (not shown) to determine when the device was at the proper height to capture an image of the pill. At the proper height, the device would activate front lighting and capture the image. The device may then analyze the image to determine the exact pill color, size, shape and any other pill visual characteristics. This data may be matched against data contained in a database that resides in the device or via a remote (wired or wireless) connection. The device may then output on the device GUI information about the imaged pill, including what it is and the percent certainty of the match. As discussed hereinbefore in the "Background" section, commonly available vision systems such as a picture phone or digital cameras may not perform such real time image capture, processing, and I/O control as is possible with the embedded imaging system 10 according to the present disclosure. The application here requires a miniature embedded vision system with real time image processing and real time I/O control. Real time image capture is required because the image must be captured when the moving device reaches the exact height where the pill is in focus. Real time I/O control is required because both the image capture and the lighting control must be enabled at the exact moment the sonar indicates the pill is in focus. A dedicated I/O interface (e.g., through the I/O controller 28B in FIG. 2) may also be required to service the pill database and the device GUI.

An embedded application requiring compact real time image capture and processing for the purpose of real time I/O control. In such an application, the combination of the vision system's (e.g., the vision system 10 in FIG. 1) miniature size and its embedded real time image capture, real time image processing, real time I/O control and I/O interface may enable the vision system 10 to perform new functions. For example, the vision system 10 may be embedded in a miniature welding robot (not shown) to provide both robotic steering and welder control. Miniature robots are used to weld the seams inside the double hull of a ship. The robot needs to follow the seam and weld it. The space available to mount a vision system on the robot is very small, so the vision system cannot be very big. The vision system 10 according to the present disclosure can be configured to easily discern the seam in real time, using a vision processing algorithm, and then provide real time steering control that would enable the robot to follow the seam well enough to weld it. In addition, the vision algorithm would also monitor the flow of the molten metal and adjust the welder parameters to insure that the metal is flowing properly. The embedded vision controller may even need to interactively balance the speed of the welding robot motion with the seam and welder parameters. In this application, an IR camera may be preferable because it readily enables images of both the welding seam and the molten metal to be easily discerned, quantified, and processed. Computer Weld Technology, located in Houston, Tex., is an example of a company that may provide a choice of algorithms related to seam tracking applications, which could be employed (with suitable modifications, if necessary) to develop the necessary imaging and control algorithms for the vision system 10. In a second application, the vision system 10 may be integrated with an air bag system (not shown) in an automobile to control the deployment of the air bag in real time. The embedded vision system 10 can continuously snap a picture of how the bag is deploying relative to the passenger. The processing of such a picture may allow the system 10 to determine an item-related attribute (e.g., the location) of the item (e.g., the air bag) relative to an object (e.g., the passenger). As the passenger's body meets the bag, the vision system 10 may continue to monitor the motion of the bag (through analysis of the bag's location in each picture taken of the bag movement during its deployment) relative to the passenger's body. The vision system 10 may be configured to control the bag's dampening constant so that the air bag will slow the passenger's forward motion in a manner that is appropriate, given the passenger's weight and the force of the collision. The vision system 10 may also be configured to provide real time feedback to the air bag system such that the air bag response is tailored to the forces of the crash and each individual passenger. In a third application, miniature robots used in military applications may greatly benefit from the addition of embedded vision system 10 to provide additional robot control feedback. For example, the Lemelson-MIT program is currently trying to create a set of "robot ants" (3 cubic inches in volume) that can act in a coordinated fashion like bees to perform tasks such as 1) working together to map out an unknown area or to find an object, 2) "swarming" a defender using some offensive attack weapon, and 3) working together to autonomously move packages around in a warehouse. With the vision system 10 according to the present disclosure embedded in each robot ant, these "robot ants" may be enabled to obtain a picture of the package they are trying to move, or to evaluate the terrain around them prior to moving. This ability for these miniature robots to "see" something and then act based on the picture is beneficial, especially in a military environment.

The foregoing describes an embedded imaging system that has the following attributes, although not all attributes need to be present in each embodiment. (1) A miniature form factor that enables the imaging system to be used in embedded automation applications. (2) The imaging system can be configured to be the main machine controller, in addition to performing all imaging functions. (3) Both real time image processing and real time control of moving objects can be performed. The real time control may be accomplished using external peripheral devices which are connected to the imaging system's internal I/O controller. (4) A modular architecture wherein the modules may be selected so that any module can be replaced or reprogrammed with little or no impact on the other modules. Some of the modules are: a camera, a configurable camera interface, on-board memory, an image processor, a lighting unit, a parasitic energy storage and discharge module, and a programmable controller with a multiplicity of configurable digital, analog and communications protocols. Some of these modules may be deleted or their functionalities combined with each other to create different embodiments of the imaging system. (5) A camera that provides true stop action, high frame rate, and high resolution images of a high speed moving object. (6) A fully programmable image processor and I/O control. (7) Ability to control illumination lighting. This lighting can be external or part of the imaging system. It is noted here that the attributes do not place limits on the light properties that may be favorably utilized in various embodiments to improve the performance or better fit a particular application. For example, any type of lighting may be used, including visible, V (Ultraviolet), IR (Infrared), or some combination thereof. Further, the configuration of the embedded imaging system according to the present disclosure does not require the lighting, camera or target image(s) be in a particular location or set of locations with regards to each other. For example, mirrors or light pipes can be utilized as part of the camera or lighting system to resolve positioning issues with regards to the camera, lighting and target source(s). A set of components of the imaging system may also be constructed to take advantage of various properties of light which include, but are not limited to, polarization, collimation, coherence, diffusion, scattering, diffraction, reflection, focusing, strobing, modulation, spectroscopic analysis and time sequencing.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method comprising performing the following using an imaging system embedded in a unit configured to transport an item with an item-transporting member of the unit:
    taking a picture of the item with a camera embedded in the unit when the item is being transported by the unit such that the item-transporting member and the item are in motion together;
    comparing said picture with a pre-stored image of said item in real-time;
    determining a quality of said item based on said comparison; and
    automatically operating one or more hardware parts in said unit in response to said determining.

2. The method of claim 1, further comprising: discarding said item in response to said determining when said quality of said item is below a minimum quality.

3. The method of claim 1, further comprising: printing said picture of said item; and supplying said printed picture along with said item.

4. The method of claim 1, wherein said comparing includes:
    extracting a first set of item-related information from said picture;
    obtaining a second set of item-related information from a storage device; and
    comparing said first and said second sets of item-related information.

5. The method of claim 1, further comprising counting in real-time each said item whose quality is determined to be satisfactory.

6. The method of claim 1, further comprising performing one of the following using said embedded imaging system:
    controlling a device to count and transport to a first destination each said item whose quality is determined to be satisfactory; and
    controlling said device to transport each said item to a second destination for disposal when the quality of said item is determined to be unsatisfactory.

7. The method of claim 1, wherein said taking includes illuminating said item.

8. The method of claim 7, wherein said illuminating includes adjusting an intensity of an artificial light.

9. The method of claim 1, further comprising providing a supplemental source of electrical energy to supply additional electrical energy on an as-needed basis during said taking of said picture of said item.

10. The method of claim 1, wherein said determining includes judging closeness between said picture of said item and said pre-stored image of said item based on said comparing in real-time.

11. A method comprising performing the following using an imaging system embedded in a unit configured to transport an item with an item-transporting member of the unit:

producing a picture of the item with a camera embedded in the unit when said item is being transported by said unit such that the item-transporting member and the item are in motion together;

comparing in real-time said picture with a pre-stored image of said item; and automatically operating one or more hardware parts in said unit in real-time in response to said comparison.

12. The method of claim 11, further comprising determining quality of said item based on said comparison.

13. The method of claim 12, further comprising:

controlling one or more of said hardware parts to discard said item when the quality is determined to be unsatisfactory; and maintaining a count of each non-discarded item.

14. The method of claim 11, further comprising illuminating said item.

15. The method of claim 14, wherein said illuminating includes adjusting an intensity of a light.

16. The method of claim 11, further comprising providing a supplemental source of electrical energy to supply additional electrical energy on an as-needed basis during said taking of said picture of said item.

17. The method of claim 11, wherein said comparing includes:

determining at least one item-related attribute of said item from said picture of said item;

obtaining a pre-stored attribute from said pre-stored image of said item; and judging closeness between said at least one item-related attribute and said pre-stored attribute.

18. A method comprising performing the following using an imaging system embedded in a pharmaceutical dispensing unit configured to transport a pharmaceutical item with an item-transporting member of the pharmaceutical dispensing unit:

taking a picture of the pharmaceutical item as it is being transported by, the pharmaceutical dispensing unit such that the item-transporting member and the pharmaceutical item are in motion together;

comparing said picture with a pre-stored image of said pharmaceutical item;

determining a quality of the pharmaceutical item based on said comparison;

operating one or more hardware parts in said pharmaceutical dispensing unit in response to said determining.

19. The method of claim 18 further comprising operating one or more hardware parts to guide the pharmaceutical item to a discard path when said quality is determined to be unsatisfactory.

20. The method of claim 18 further comprising operating one or more hardware parts to guide the pharmaceutical item to a customer container when said quality is determined to be satisfactory.

21. The method of claim 20 further comprising counting the pharmaceutical items that are guided to the customer container.

22. The method of claim 18 wherein determining a quality of the pharmaceutical item further comprises determining the physical integrity of the pharmaceutical item.

23. The method of claim 18 wherein determining a quality of the pharmaceutical item further comprises determining the size, shape, color, orientation, spectra, position or identity of the pharmaceutical item.

24. The method of claim 18 wherein at least one of the taking, comparing, determining and operating steps is performed automatically.

25. A method comprising performing the following using an imaging system embedded in a unit configured to transport an item with an item-transporting member of the unit:

taking a picture of the item with a camera embedded in the unit when the item is being transported by the unit such that the item-transporting member and the item are in motion together, wherein said taking includes operating the imaging system to take a picture of said item when said item is in a field of view of said imaging system;

comparing said picture with a pre-stored image of said item in real-time;

determining a quality of said item based on said comparison; and automatically operating one or more hardware parts in said unit in response to said determining.

26. A method comprising performing the following using an imaging system embedded in a unit configured to transport an item with an item-transporting member of the unit:

producing a picture of the item with a camera embedded in the unit when said item is being transported by said unit such that the item-transporting member and the item are in motion together;

comparing in real-time said picture with a pre-stored image of said item; and automatically operating one or more hardware parts in said unit in real-time in response to said comparison, wherein said one or more hardware parts is selected from the group consisting of lighting, flippers, diverters, cameras, motors, vacuum sources and dispensers.

* * * * *

UNITED STATES PATENT AND TRADEMARK OFFICE
CERTIFICATE OF CORRECTION

| | | |
|---|---|---|
| PATENT NO. | : 8,121,392 B2 | Page 1 of 1 |
| APPLICATION NO. | : 10/972492 | |
| DATED | : February 21, 2012 | |
| INVENTOR(S) | : Popovich, Jr. et al. | |

It is certified that error appears in the above-identified patent and that said Letters Patent is hereby corrected as shown below:

<u>In the Claims</u>:
Column 23, Claim 18, Line 37: Please correct "by, the" to read -- by the --

Signed and Sealed this
Sixteenth Day of October, 2012

David J. Kappos
*Director of the United States Patent and Trademark Office*